(12) United States Patent
Choi et al.

(10) Patent No.: US 11,490,088 B2
(45) Date of Patent: Nov. 1, 2022

(54) CONVERSION FACTOR LEVEL CODING METHOD AND DEVICE THEREFOR

(71) Applicant: LG Electronics Inc., Seoul (KR)

(72) Inventors: Jungah Choi, Seoul (KR); Seunghwan Kim, Seoul (KR); Sunmi Yoo, Seoul (KR); Jangwon Choi, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/365,559

(22) Filed: Jul. 1, 2021

(65) Prior Publication Data

US 2021/0337206 A1 Oct. 28, 2021

Related U.S. Application Data

(63) Continuation of application No. 16/856,406, filed on Apr. 23, 2020, now Pat. No. 11,095,897, which is a continuation of application No. PCT/KR2019/012226, filed on Sep. 20, 2019.

(60) Provisional application No. 62/734,233, filed on Sep. 20, 2018, provisional application No. 62/734,266, filed on Sep. 21, 2018.

(51) Int. Cl.
*H04N 19/132* (2014.01)
*H04N 19/129* (2014.01)
*H04N 19/176* (2014.01)
*H04N 19/46* (2014.01)

(52) U.S. Cl.
CPC ......... *H04N 19/132* (2014.11); *H04N 19/129* (2014.11); *H04N 19/176* (2014.11); *H04N 19/46* (2014.11)

(58) Field of Classification Search
CPC .. H04N 19/132; H04N 19/129; H04N 19/176; H04N 19/46; H04N 19/13; H04N 19/18; H04N 19/70; H04N 19/513; H04N 19/124
See application file for complete search history.

(56) References Cited

U.S. PATENT DOCUMENTS

| 9,088,769 | B2 | 7/2015 | He et al. |
| 2013/0177069 | A1 | 7/2013 | Sze et al. |

(Continued)

FOREIGN PATENT DOCUMENTS

| EP | 3850856 A1 | 7/2021 |
| JP | 2015507424 A | 3/2015 |

(Continued)

OTHER PUBLICATIONS

U.S. Appl. No. 62/722,237, dated Aug. 24, 2018.
(Continued)

*Primary Examiner* — Hesham K Abouzahra
(74) *Attorney, Agent, or Firm* — Dentons US LLP

(57) ABSTRACT

A method for decoding an image by a decoding device according to the present disclosure comprises the steps of: receiving a bit stream including residual information; deriving a quantized conversion factor of a current block on the basis of the residual information included in the bit stream; deriving a residual sample of the current block on the basis of the quantized conversion factor; and generating a reconstructed picture on the basis of the residual sample of the current block.

14 Claims, 11 Drawing Sheets

(56) References Cited

U.S. PATENT DOCUMENTS

| | | | |
|---|---|---|---|
| 2013/0182757 A1* | 7/2013 | Karczewicz | H04N 19/13 375/240.18 |
| 2020/0077117 A1* | 3/2020 | Karczewicz | H04N 19/50 |

FOREIGN PATENT DOCUMENTS

| | | | |
|---|---|---|---|
| JP | 2017147745 A | 8/2017 | |
| KR | 20150037782 A | 4/2015 | |
| KR | 20160088085 A | 7/2016 | |
| KR | 20160133509 A | 11/2016 | |
| KR | 101772740 B1 | 8/2017 | |
| WO | 2013/109357 A1 | 7/2013 | |
| WO | 2020/007785 A1 | 1/2020 | |
| WO | 2020/038311 A1 | 2/2020 | |
| WO | 2020/038465 A1 | 2/2020 | |
| WO | 2020/051324 A1 | 3/2020 | |
| WO | 2020054713 A1 | 3/2020 | |

OTHER PUBLICATIONS

U.S. Appl. No. 62/732,454, dated Sep. 17, 2018.
JVET-L0274: "CE7: Transform coefficient coding with reduced number of regular-coded bins (tests 7.1.3a, 7.1.3b)," Schwarz et al., Joint Video Experts Team (JVET) of ITU-T SG 16 WP 3 and ISO/IEC JTC 1/SC 29/WG 11 12th Meeting: Macao, CN Oct. 3-12, 2018, Fraunhofer HHI and Qualcomm Inc. (14 Pages).
JVET-L1002-v-1: "Algorithm description for Versatile Video Coding and Test Model 3 (VTM 3)," Chen et al., Joint Video Experts Team (JVET) of ITU-T SG 16 WP 3 and ISO/IEC JTC 1/SC 29/WG 11 12th Meeting: Macao, CN Dec. 3-12, 2018, Editors (37 Pages).
JVET-K0072: Draft text for JVET-K0072 (Including JVET decisions) Fraunhofer, H et al: "Jul. 16, 2018, "Non-: Alternative entropy coding for dependent quantization," CE7Versatile Video Coding (draft 1)," (48 pages).
JVET-K1001: Versatile Video Coding (Draft 2), Bross B et al., Editors, Joint Video Experts Team (JVET) of ITU-T SG 16 WP 3 and ISO/IEC JTC 1/SC 29/ WG 11, 11th Meeting: Ljubljana, SI, Jul. 10-18, 2018, Sep. 18, 2018, (130 Pages).
JCTVC-I0281: Nguyen et al., Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012; "Adaptive Thresholds for Greater-Than-1 and Greater-Than-2 Flags," Research In Motion Ltd. (7 Pages).
JCTVC-H0554: Chen et al., Collaborative Team on Video Coding (JCT-VC) of ITU-T SG16 WP3 and ISO/IEC JTC1/SC29/WG11 8th Meeting: San Jose, CA, USA, Feb. 1-10, 2012, "Non-CE1: throughput improvement on CABAC coefficients level coding," Qualcomm Inc. (14 Pages).

* cited by examiner

CONVERSION FACTOR LEVEL CODING METHOD AND DEVICE THEREFOR

CROSS-REFERENCE TO RELATED APPLICATIONS

This application is a continuation of U.S. patent application Ser. No. 16/856,406 filed on Apr. 23, 2020, which is a continuation of International Application PCT/KR2019/012226, with an international filing date of Sep. 20, 2019, which claims the benefit of U.S. Provisional Applications No. 62/734,233 filed on Sep. 20, 2018 and No. 62/734,266 filed on Sep. 21, 2018, the contents of which are all hereby incorporated by reference herein in their entirety.

BACKGROUND OF THE DISCLOSURE

Field of the Disclosure

The present disclosure relates to an image coding technology, and more particularly, to a method for coding a transform coefficient level of an image coding system and a device thereof.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compaction technique is required to effectively compress and transmit, store, or play high resolution, high quality images/videos showing various characteristics as described above.

SUMMARY

An object of the present disclosure is to provide a method and a device for enhancing image coding efficiency.

Another object of the present disclosure is to provide a method and a device for enhancing the efficiency of residual coding.

Still another object of the present disclosure is to provide a method and a device for enhancing the efficiency of coding transform coefficient level.

Yet another object of the present disclosure is to provide a method and a device for enhancing residual coding efficiency by performing a binarization process on residual information based on a rice parameter.

Still yet another object of the present disclosure is to provide a method and a device for enhancing coding efficiency by determining (or changing) a decoding order of a parity level flag for a parity of a transform coefficient level for a quantized transform coefficient and a first transform coefficient level flag about whether the transform coefficient level is larger than a first threshold.

A further object of the present disclosure is to provide a method and a device for enhancing coding efficiency by limiting the sum of the number of significant coefficient flags for quantized transform coefficients within a current block, the number of first transform coefficient level flags, the number of parity level flags, and the number of second transform coefficient level flags, which are included in residual information, to a predetermined threshold or less.

Another further object of the present disclosure is to provide a method and a device for reducing data which are coded based on contexts by limiting the sum of the number of significant coefficient flags for quantized transform coefficients within a current block, the number of first transform coefficient level flags, the number of parity level flags, and the number of second transform coefficient level flags, which are included in residual information, to a predetermined threshold or less.

An embodiment of the present disclosure provides a method for decoding an image performed by a decoding apparatus. The method includes receiving a bitstream including residual information, deriving a quantized transform coefficient for a current block based on the residual information included in the bitstream, deriving a residual sample for the current block based on the quantized transform coefficient, and generating a reconstructed picture based on the residual sample for the current block, and the residual information includes a parity level flag for a parity of a transform coefficient level for the quantized transform coefficient and a first transform coefficient level flag about whether the transform coefficient level is larger than a first threshold, the deriving of the quantized transform coefficient includes decoding the first transform coefficient level flag, and decoding the parity level flag, and deriving the quantized transform coefficient based on a value of the decoded parity level flag and a value of the decoded first transform coefficient level flag, and the decoding of the first transform coefficient level flag is performed prior to the decoding of the parity level flag.

Another embodiment of the present disclosure provides a decoding apparatus for performing image decoding. The decoding apparatus includes an entropy decoder which receives a bitstream including residual information, and derives an quantized transform coefficient for a current block based on the residual information included in the bitstream, an inverse transformer which derives a residual sample for the current block based on the quantized transform coefficient, and an adder which generates a reconstructed picture based on the residual sample for the current block, the residual information includes a parity level flag for a parity of a transform coefficient level for the quantized transform coefficient and a first transform coefficient level flag about whether the transform coefficient level is larger than a first threshold, deriving the quantized transform coefficient performed by the entropy decoder includes decoding the first transform coefficient level flag, and decoding the parity level flag, and deriving the quantized transform coefficient based on a value of the decoded parity level flag and a value of the decoded first transform coefficient level flag, and the decoding of the first transform coefficient level flag is performed prior to the decoding of the parity level flag.

Still another embodiment of the present disclosure provides a method for encoding an image performed by an encoding apparatus. The method includes deriving a residual sample for a current block, deriving a quantized transform coefficient based on the residual sample for the current block, and encoding residual information including information for the quantized transform coefficient, and the residual information includes a parity level flag for a parity of a transform coefficient level for the quantized transform coefficient and a first transform coefficient level flag about whether the transform coefficient level is larger than a first threshold, the encoding of the residual information includes deriving a value of the parity level flag and a value of the first transform coefficient level flag based on the quantized transform coefficient, and encoding the first transform coefficient level flag, and encoding the parity level flag, and the encoding of the first transform coefficient level flag is performed prior to the encoding of the parity level flag.

Yet another embodiment of the present disclosure provides an encoding apparatus for performing image encoding. The encoding apparatus includes a subtractor which derives a residual sample for a current block, a quantizer which derives a quantized transform coefficient based on the residual sample for the current block, and an entropy encoder which encodes residual information including information about the quantized transform coefficient, and the residual information includes a parity level flag for a parity of a transform coefficient level for the quantized transform coefficient and a first transform coefficient level flag about whether the transform coefficient level is larger than a first threshold, the encoding of the residual information performed by the entropy encoder includes deriving a value of the parity level flag and a value of the first transform coefficient level flag based on the quantized transform coefficient, and encoding the first transform coefficient level flag, and encoding the parity level flag, and the encoding of the first transform coefficient level flag is performed prior to the encoding of the parity level flag.

Still yet another embodiment of the present disclosure provides a decoder readable storage medium which stores information about instructions causing a video decoding apparatus to perform decoding methods according to some embodiments.

A further embodiment of the present disclosure provides a decoder readable storage medium which stores information about instructions causing a video decoding apparatus to perform a decoding method according to an embodiment. The decoding method according to an embodiment includes receiving a bitstream including residual information, deriving a quantized transform coefficient for a current block based on the residual information included in the bitstream, deriving a residual sample for the current block based on the quantized transform coefficient, and generating a reconstructed picture based on the residual sample for the current block, and the residual information includes a parity level flag for a parity of a transform coefficient level for the quantized transform coefficient and a first transform coefficient level flag about whether the transform coefficient level is larger than a first threshold, the deriving of the quantized transform coefficient includes decoding the first transform coefficient level flag and decoding the parity level flag, and deriving the quantized transform coefficient based on a value of the decoded parity level flag and a value of the decoded first transform coefficient level flag, and the decoding of the first transform coefficient level flag is performed prior to the decoding of the parity level flag.

According to the present disclosure, it is possible to enhance the overall image/video compaction efficiency.

According to the present disclosure, it is possible to enhance the efficiency of the residual coding.

According to the present disclosure, it is possible to enhance the residual coding efficiency by performing the binarization process on the residual information based on the rice parameters.

According to the present disclosure, it is possible to enhance the efficiency of the transform coefficient level coding.

According to the present disclosure, it is possible to enhance the residual coding efficiency by performing the binarization process on the residual information based on the rice parameters.

According to the present disclosure, it is possible to enhance the coding efficiency by determining (or changing) the decoding order of the parity level flag for the parity of the transform coefficient level for the quantized transform coefficient and the first transform coefficient level flag about whether the transform coefficient level is larger than the first threshold.

According to the present disclosure, it is possible to enhance the coding efficiency by limiting the sum of the number of significant coefficient flags for the quantized transform coefficients within the current block, the number of first transform coefficient level flags, the number of parity level flags, and the number of second transform coefficient level flags, which are included in the residual information, to a predetermined threshold or less.

According to the present disclosure, it is possible to reduce the data which are coded based on the context by limiting the sum of the number of significant coefficient flags for the quantized transform coefficients within the current block, the number of first transform coefficient level flags, the number of parity level flags, and the number of second transform coefficient level flags, which are included in the residual information, to a predetermined threshold or less.

DESCRIPTION OF EXEMPLARY EMBODIMENTS

Figure 1:
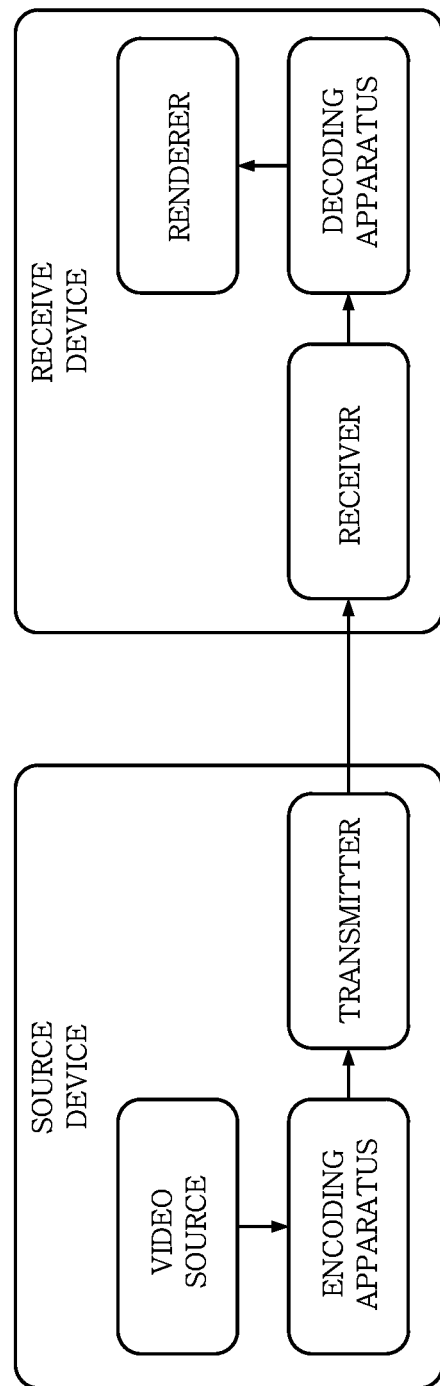
FIG. 1 is a diagram schematically illustrating an example of a video/image coding system to which the present disclosure may be applied.

An embodiment of the present disclosure provides a method for decoding an image performed by a decoding apparatus. The method includes receiving a bitstream including residual information, deriving a quantized transform coefficient for a current block based on the residual information included in the bitstream, deriving a residual sample for the current block based on the quantized transform coefficient, and generating a reconstructed picture based on the residual sample for the current block, and the residual information includes a parity level flag for a parity of a transform coefficient level for the quantized transform coefficient and a first transform coefficient level flag about whether the transform coefficient level is larger than a first threshold, the deriving of the quantized transform coefficient includes decoding the first transform coefficient level flag, and decoding the parity level flag, and deriving the quantized transform coefficient based on the decoded parity level flag and the decoded first transform coefficient level flag, and the decoding of the first transform coefficient level flag is performed prior to the decoding of the parity level flag.

The present disclosure may be changed variously and may have various embodiments, and specific embodiments thereof will be described in detail and illustrated in the drawings. However, this does not limit the present disclosure to specific embodiments. The terms used in the present specification are used to merely describe specific embodiments and are not intended to limit the technical spirit of the present disclosure. An expression of a singular number includes an expression of the plural number, so long as it is clearly read on the context differently. The terms such as "include" and "have" in the present specification are intended to represent that features, numbers, steps, operations, components, parts, or combinations thereof used in the specification exist, and it should be understood that the possibility of existence or addition of one or more different features, numbers, steps, operations, components, parts, or combinations thereof is not excluded in advance.

Meanwhile, each of the components in the drawings described in the present disclosure is illustrated independently for the convenience of description regarding different characteristic functions, and does not mean that each of the components is implemented in separate hardware or separate software. For example, two or more of the components may be combined to form one component, or one component may be divided into a plurality of components. Embodiments in which each component is integrated and/or separated are also included in the scope of the present disclosure without departing from the spirit of the present disclosure.

Hereinafter, preferred embodiments of the present disclosure will be described in more detail with reference to the accompanying drawings. Hereinafter, the same reference numerals are used for the same components in the drawings, and redundant description of the same components may be omitted.

FIG. 1 illustrates an example of a video/image coding system to which the present disclosure may be applied.

This document relates to video/image coding. For example, the methods/embodiments disclosed in this document may be applied to a method which is disclosed in a versatile video coding (VVC) standard, an essential video coding (EVC) standard, an AOMedia Video 1 (AV1) standard, a 2nd generation of audio video coding standard (AVS2), or a next generation video/image coding standard (for example, H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specified sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In this document, a tile group and a slice may be used interchangeably. For example, in this document, a tile group/tile group header may also be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to represent "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to represent "and/or." For instance, the expression "A or B" may comprise 1) only A, 2) only B, and/or 3) both A and B. In other words, the term "or" in this document should be interpreted to represent "additionally or alternatively."

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The receiver may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
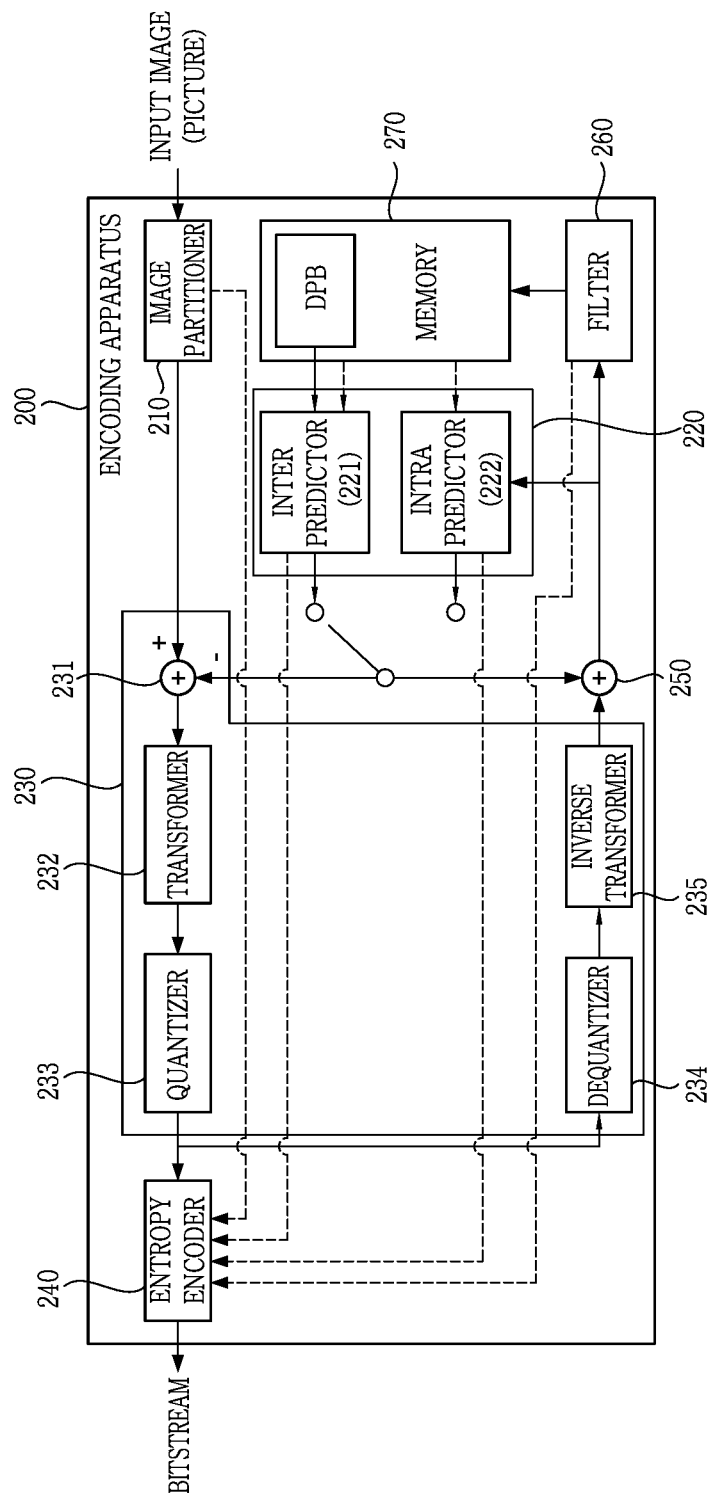
FIG. 2 is a diagram schematically explaining a configuration of a video/image encoding apparatus to which the present disclosure may be applied.

FIG. 2 illustrates a structure of a video/image encoding apparatus to which the present disclosure may be applied. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. Further, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information representing which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). Further, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève Transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. Further, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). Further, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal.

For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
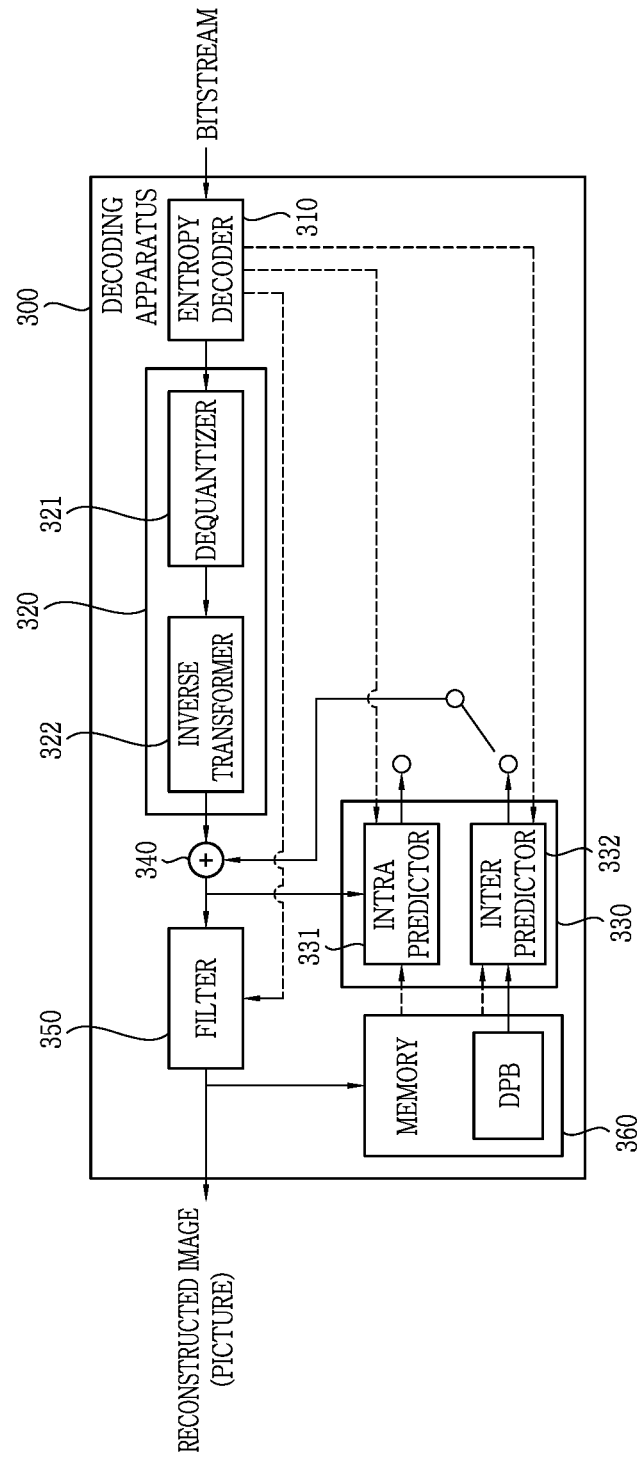
FIG. 3 is a diagram schematically explaining a configuration of a video/image decoding apparatus to which the present disclosure may be applied.

FIG. 3 illustrates a structure of a video/image decoding apparatus to which the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. Further, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). Further, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). Further, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). Further, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information representing a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to enhance compaction efficiency. Accordingly, a predicted block including prediction samples for a current block which is a coding target block may be generated. Here, the predicted block includes prediction samples in a spatial domain (or pixel domain). The predicted block is derived equally from an encoding apparatus and a decoding apparatus, and the encoding apparatus may signal information (residual information) about the residual between the original block and the predicted block rather than the original sample value itself of the original block to the decoding apparatus, thereby enhancing image coding efficiency. The decoding apparatus may derive a residual block including residual samples based on the residual information, generate a reconstructed block including reconstruction samples by summing the residual block and the predicted block, and generate a reconstructed picture including the restructured blocks.

The residual information may be generated through transform and quantization procedures. For example, the encoding apparatus may signal related residual information to the decoding apparatus (through a bitstream) by deriving the residual block between the original block and the predicted block, deriving transform coefficients by performing the transform procedure for the residual samples (residual sample array) included in the residual block, and deriving quantized transform coefficients by performing the quantization procedure for the transform coefficients. Here, the residual information may include information such as the value information, position information, transform technique, transform kernel, and quantization parameter of the quantized transform coefficients. The decoding apparatus may perform dequantization/inverse transform procedures based on the residual information and derive the residual samples (or residual blocks). The decoding apparatus may generate a reconstructed picture based on the predicted block and the residual block. The encoding apparatus may also derive the residual block by dequantizing/inversely transforming the quantized transform coefficients for the reference for the inter prediction of a picture later, and generate the reconstructed picture based thereon.

Figure 4:
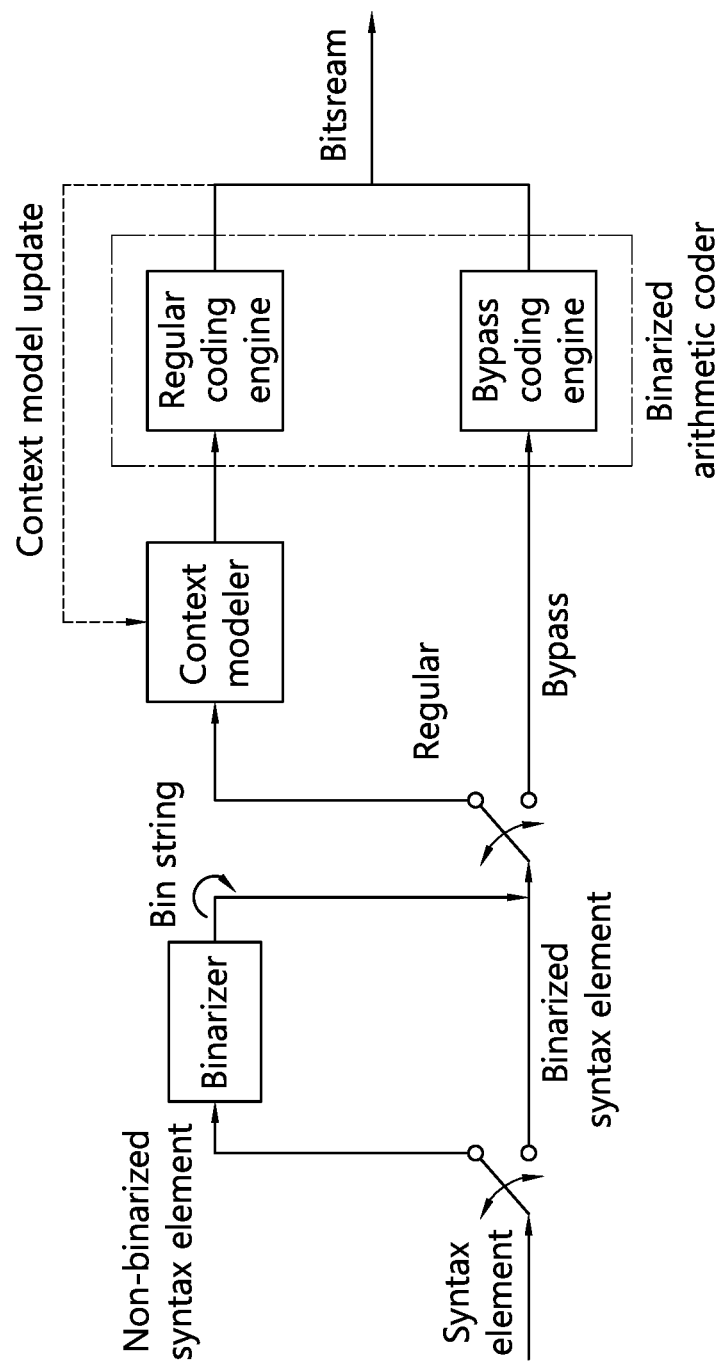
FIG. 4 is a block diagram of a CABAC encoding system according to an embodiment.

FIG. 4 is a block diagram of a CABAC encoding system according to an embodiment.

Referring to FIG. 4, a block diagram of CABAC for encoding a single syntax element is illustrated. In the process of encoding the CABAC, first, if an input signal is a non-binary syntax element, the input signal may be transformed into a binary value through binarization. If the input signal is already the binary value, the input signal may be bypassed without the binarization. Here, each binary 0 or 1 configuring the binary value may be referred to as a bin. For example, when a binary string after the binarization is 110, each of 1, 1, and 0 may be referred to as one bin.

The binarized bins may be input to a regular encoding engine or a bypass encoding engine. The regular encoding engine may assign a context model which reflects a probability value to the corresponding bin, and encode the corresponding bin based on the assigned context model. The regular encoding engine may update a probability model for the corresponding bin after encoding each bin. The thus encoded bins are referred to as context-coded bins. The bypass encoding engine may omit a procedure of estimating the probability for the input bin and a procedure of updating the probability model applied to the corresponding bin after the encoding. By encoding the input bin by applying a uniform probability distribution instead of assigning the context, it is possible to improve the coding speed. The thus encoded bins may be referred to as bypass bins.

Entropy encoding may determine whether to perform encoding through the regular encoding engine or whether to perform encoding through the bypass encoding engine, and switch encoding paths. Entropy decoding may perform the same process as the encoding inversely.

In an embodiment, the (quantized) transform coefficients may be encoded and/or decoded based on the syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, rem_abs_gt1_flag, rem_abs_gt2_flag, abs_remainder, coeff_sign_flag, and mts_idx. Table 1 below represents the syntax elements related to the encoding of the residual data.

TABLE 1

| | Descriptor |
|---|---|
| residual_coding( x0, y0, log2TbWidth, log2TbHeight, cIdx ) { | |
|   if( transform_skip_enabled_flag && | |
|   ( cIdx != 0 \|\| cu_mts_flag[ x0 ][ y0 ] = = 0) && | |
|     ( log2TbWidth <= 2) && ( log2TbHeight <= 2 ) ) | |
|       transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = | |
|   DiagScanOrder[ log2TbWidth − log2SbSize ][ log2TbHeight − log2SbSize ] | |
|       [ lastSubBlock ][ 0 ] | |
|     yS = | |
|   DiagScanOrder[ log2TbWidth − log2SbSize ][ log2TbHeight − log2SbSize ] | |
|       [ lastSubBlock ][ 1 ] | |

TABLE 1-continued

| | Descriptor |
|---|---|
| ```
        xC = ( xS << log2SbSize ) +
            DiagScanOrder[ log2SbSize ][ log2SbSize ][ lastScanPos ][ 0 ]
        yC = ( yS << log2SbSize ) +
            DiagScanOrder[ log2SbSize ][ log2SbSize ][ lastScanPos ][ 1 ]
    } while( ( xC != LastSignificantCoeffX ) | | ( yC !=
LastSignificantCoeffY ) )
    QState = 0
    for( i = lastSubBlock; i >= 0; i− − ) {
        startQStateSb = QState
        xS =
DiagScanOrder[ log2TbWidth − log2SbSize ][ log2TbHeight − log2SbSize ]
            [ lastSubBlock ][ 0 ]
        yS =
DiagScanOrder[ log2TbWidth − log2SbSize ][ log2TbHeight − log2SbSize ]
            [ lastSubBlock ][ 1 ]
        inferSbDcSigCoeffFlag = 0
        if( ( i < lastSubBlock ) && ( i > 0 ) ) {
            coded_sub_block_flag[ xS ][ yS ]
            inferSbDcSigCoeffFlag = 1
        }
        firstSigScanPosSb = numSbCoeff
        lastSigScanPosSb = −1
        for( n = ( i = = lastSubBlock ) ? lastScanPos − 1 : numSbCoeff − 1; n >=
0; n− − ) {
            xC = ( xS << log2SbSize ) +
DiagScanOrder[ log2SbSize ][ log2SbSize ][ n ][ 0 ]
            yC = ( yS << log2SbSize ) +
DiagScanOrder[ log2SbSize ][ log2SbSize ][ n ][ 1 ]
            if( coded_sub_block_flag[ xS ][ yS ] && ( n > 0 | |
!inferSbDcSigCoeffFlag ) ) {
                sig_coeff_flag[ xC ][ yC ]
            }
            if( sig_coeff_flag[ xC ][ yC ] ) {
                par_level_flag[ n ]
                rem_abs_gt1_flag[ n ]
                if( lastSigScanPosSb = = −1 )
                    lastSigScanPosSb = n
                firstSigScanPosSb = n
            }
                AbsLevelPass1[ xC ][ yC ] =
                    sig_coeff flag[ xC ][ yC ] + par_level_flag[ n ] + 2 *
rem_abs_gt1_flag[ n ]
                if( dep_quant_enabled_flag )
                    QState = QStateTransTable [ QState ][ par_level_flag[ n ] ]
        }
        for( n = numSbCoeff − 1; n >= 0; n− − ) {
            if( rem_abs_gt1_flag[ n ] )
                rem_abs_gt2_flag[ n ]
        }
        for( n = numSbCoeff − 1; n >= 0; n− − ) {
            xC = ( xS << log2SbSize ) +
DiagScanOrder[ log2SbSize ][ log2SbSize ][ n ][ 0 ]
            yC = ( yS << log2SbSize ) +
DiagScanOrder[ log2SbSize ][ log2SbSize ][ n ][ 1 ]
            if( rem_abs_gt2_flag[ n ] )
                abs_remainder[ n ]
            AbsLevel[ xC ][ yC ] = AbsLevelPass1[ xC ][ yC ] +
                2 * ( rem_abs_gt2_flag[ n ] + abs_remainder[ n ] )
        }
        if( dep_quant_enabled_flag | | !sign_data_hiding_enabled_flag )
            signHidden = 0
        else
            signHidden = ( lastSigScanPosSb − firstSigScanPosSb > 3 ? 1 : 0 )
        for( n = numSbCoeff − 1; n >= 0; n− − ) {
            xC = ( xS << log2SbSize ) +
DiagScanOrder[ log2SbSize ][ log2SbSize ][ n ][ 0 ]
            yC = ( yS << log2SbSize ) +
DiagScanOrder[ log2SbSize ][ log2SbSize ][ n ][ 1 ]
            if( sig_coeff_flag[ xC ][ yC ] &&
                ( !signHidden | | ( n != firstSigScanPosSb ) ) )
                coeff_sign_flag[ n ]
        }
        if( dep_quant_enabled_flag ) {
            QState = startQStateSb
            for( n = numSbCoeff − 1; n >= 0; n− − ) {
                xC = ( xS << log2SbSize ) +
                    DiagScanOrder[ log2SbSize ][ log2SbSize ][ n ][ 0 ]
                yC = ( yS <<log2SbSize ) +
``` | ae(v)<br><br><br><br><br><br><br><br><br><br><br><br><br><br><br>ae(v)<br><br>ae(v)<br>ae(v)<br><br><br><br><br><br><br><br><br><br><br>ae(v)<br><br><br><br><br><br><br><br><br><br><br><br><br><br><br><br>ae(v) |

TABLE 1-continued

Descriptor

```
            DiagScanOrder[ log2SbSize ][ log2SbSize ][ n ][ 1 ]
        if( sig_coeff_flag[ xC ][ yC ] )
            TransCoeffLevel[ x0 ][ y0 ][ cIdx ][ xC ][ yC ] =
                ( 2 * AbsLevel[ xC ][ yC ] - ( QState > 1 ? 1 : 0 ) ) *
                ( 1 - 2 * coeff_sign_flag[ n ] )
            QState = QStateTransTable[ QState ][ par_level_flag[ n ] ]
    } else {
        sumAbsLevel = 0
        for( n = numSbCoeff - 1; n >= 0; n- - ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] ) {
                TransCoeffLevel[ x0 ][ y0 ][ cIdx ][ xC ][ yC ] =
                    AbsLevel[ xC ][ yC ] * ( 1 - 2 * coeff_sign_flag[ n ] )
                if( signHidden ) {
                    sumAbsLevel += AbsLevel[ xC ][ yC ]
                    if( ( n = = firstSigScanPosSb ) && ( sumAbsLevel % 2)
= = 1 ) )
                        TransCoeffLevel[ x0 ][ y0 ][ cIdx ][ xC ][ yC ] =
                            -TransCoeffLevel[ x0 ][ y0 ][ cIdx ][ xC ][ yC ]
                }
            }
        }
    }
}
if( cu_mts_flag[ x0 ][ y0 ] && ( cIdx = = 0) &&
    !transform_skip_flag[ x0 ][ y0 ][ cIdx ] &&
    ( ( CuPredMode[ x0 ][ y0 ] = = MODE_INTRA && numSigCoeff > 2) | |
    ( CuPredMode[ x0 ][ y0 ] = = MODE_INTER ) ) ) {
    mts_idx[ x0 ][ y0 ]                                                        ae(v)
}
```

The transform_skip_flag represents whether transform is omitted in an associated block. The associated block may be a coding block (CB) or a transform block (TB). With regard to the transform (and quantization) and residual coding procedures, the CB and the TB may be used interchangeably. For example, as described above, the residual samples may be derived for the CB, and the (quantized) transform coefficients may be derived through the transform and the quantization for the residual samples, and information (for example, syntax elements) efficiently representing the position, size, sign, and the like of the (quantized) transform coefficients may be generated and signaled through the residual coding procedure. The quantized transform coefficients may simply be referred to as transform coefficients. Generally, if the CB is not larger than the maximum TB, the size of the CB may be equal to the size of the TB, and in this case, the target block to be transformed (and quantized) and residual coded may be referred to as CB or TB. Meanwhile, if the CB is larger than the maximum TB, the target block to be transformed (and quantized) and residual coded may be referred to as TB. Hereinafter, although it will be described that the syntax elements related to the residual coding are signaled in units of transform block (TB), this is an example and the TB may be used interchangeably with the coding block (CB) as described above.

In an embodiment, (x, y) position information of the last non-zero transform coefficient within the transform block may be encoded based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents the prefix of the column position of the last significant coefficient in the scanning order within the transform block, the last_sig_coeff_y_prefix represents the prefix of the row position of the last significant coefficient in the scanning order within the transform block, the last_sig_coeff_x_suffix represents the suffix of the column position of the last significant coefficient in the scanning order within the transform block, and the last_sig_coeff_y_suffix represents the suffix of the row position of the last significant coefficient in the scanning order within the transform block. Here, the significant coefficient may represent the non-zero coefficient. The scanning order may be an up-right diagonal scanning order. Alternatively, the scanning order may be a horizontal scanning order or a vertical scanning order. The scanning order may be determined based on whether intra/inter prediction is applied to the target block (CB, or CB including TB) and/or a specific intra/inter prediction mode.

Subsequently, after the transform block is divided into 4×4 sub-blocks, a 1-bit syntax element coded_sub_block_flag may be used every 4×4 sub-block to represent whether the non-zero coefficient exists within the current sub-block.

If a value of the coded_sub_block_flag is 0, there is no more information to be transmitted, such that the encoding process for the current sub-block may be terminated. Conversely, if the value of the coded_sub_block_flag is 1, the encoding process for the sig_coeff_flag may be continuously performed. Since the encoding for the coded_sub_block_flag is not required for the sub-block including the last non-zero coefficient, and the sub-block including DC information of the transform block has a high probability of including the non-zero coefficient, the coded_sub_block_flag is not encoded and the value thereof may be assumed to be 1.

If the value of the coded_sub_block_flag is 1 and it is determined that the non-zero coefficient exists within the current sub-block, the sig_coeff_flag having a binary value may be encoded according to the inversely scanned order. A 1-bit syntax element sig_coeff_flag may be encoded for each coefficient according to the scanning order. If the value of the transform coefficient at the current scan position is non-zero, the value of the sig_coeff_flag may be 1. Here, in the case of the sub-block including the last non-zero coefficient, since the sig_coeff_flag is not required for the last non-zero coefficient, the encoding process for the sub-block may be omitted. Level information may be encoded only when the sig_coeff_flag is 1, and four syntax elements may be used in the level information encoding process. More specifically, each sig_coeff_flag [xC] [yC] may represent whether the level (value) of the corresponding transform coefficient at each transform coefficient position (xC, yC) within the current TB is non-zero. In an embodiment, the sig_coeff_flag may correspond to an example of the significant coefficient flag which represents whether the quantized transform coefficient is a non-zero significant coefficient.

The remaining level value after the sig_coeff_flag is encoded may be expressed by Equation 1 below. That is, the syntax element remAbsLevel representing the level value to be encoded may be as expressed by Equation 1 below. Here, the coeff means an actual transform coefficient value.

$$\text{remAbsLevel} = |\text{coeff}| - 1 \quad \text{Equation 1}$$

As expressed by Equation 2 below, a value of the least significant coefficient (LSB) of the remAbsLevel expressed by Equation 1 may be encoded through the par_level_flag. Here, the par_level_flag [n] may represent a parity of the transform coefficient level (value) at the scan position (n). After the par_level_flag is encoded, a transform coefficient level value remAbsLevel to be encoded may be updated as expressed by Equation 3 below.

$$par\_\text{level\_flag} = \text{remAbsLevel} \,\&\, 1 \quad \text{Equation 2}$$

$$\text{remAbsLevel}' = \text{remAbsLevel} >> 1 \quad \text{Equation 3}$$

The rem_abs_gt1_flag may represent whether the remAbsLevel' at the corresponding scan position (n) is larger than 1, and the rem_abs_gt2_flag may represent whether the remAbsLevel' at the corresponding scan position (n) is larger than 2. The abs_remainder may be encoded only when the rem_abs_gt2_flag is 1. The relationship between the actual transform coefficient value (coeff) and the respective syntax elements is summarized, for example, as expressed by Equation 4 below, and Table 2 below represents examples related to Equation 4. Further, the sign of each coefficient may be encoded by using a 1-bit symbol coeff_sign_flag. The |coeff| represents the transform coefficient level (value), and may also be expressed as AbsLevel for the transform coefficient.

$$|\text{coeff}| = sig\_\text{coeff\_flag} + par\_\text{level\_flag} + 2 * \\ (rem\_\text{abs\_gt1\_flag} + rem\_\text{abs\_gt2\_flag} + \text{abs\_remainder}) \quad \text{Equation 4}$$

TABLE 2

| \|coeff\| | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

Meanwhile, in an embodiment, the par_level_flag may represent an example of a parity level flag for the parity of the transform coefficient level for the quantized transform coefficient, the rem_abs_gt1_flag may represent an example of a first transform coefficient level flag about whether the transform coefficient level is larger than a first threshold, and the rem_abs_gt2_flag may represent an example of a second transform coefficient level flag about whether the transform coefficient level is larger than a second threshold.

Further, in another embodiment, the rem_abs_gt2_flag may also be referred to as rem_abs_gt3_flag, and in still another embodiment, the rem_abs_gt1_flag and the rem_abs_gt2_flag may be represented based on the abs_level_gtx_flag [n] [j]. The abs_level_gtx_flag [n] [j] may be a flag representing whether an absolute value of the transform coefficient level (or value obtained by shifting the transform coefficient level to the right by 1) at the scan position (n) is larger than (j<<1)+1. In an example, the rem_abs_gt1_flag may perform the function which is the same as and/or similar to the abs_level_gtx_flag [n] [0], and the rem_abs_gt2_flag may perform the function which is the same as and/or similar to the abs_level_gtx_flag [n] [1]. That is, the abs_level_gtx_flag [n] [0] may correspond to an example of the first transform coefficient level flag, and the abs_level_gtx_flag [n] [1] may correspond to an example of the second transform coefficient level flag. The (j<<1)+1 may also be replaced with a predetermined threshold such as a first threshold and a second threshold in some cases.

Figure 5:
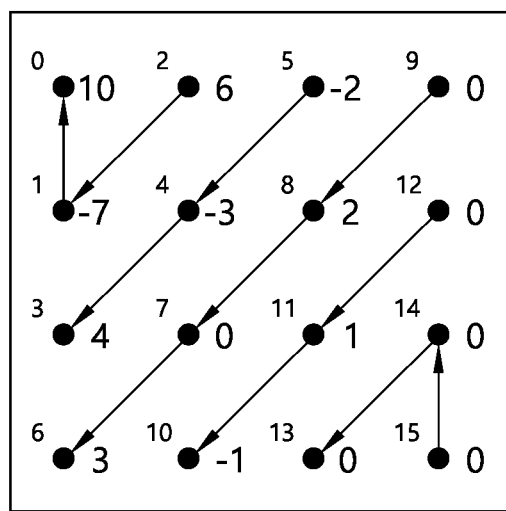
FIG. 5 is a diagram illustrating an example of transform coefficients within a 4×4 block.

FIG. 5 is a diagram illustrating an example of the transform coefficients within a 4×4 block.

The 4×4 block illustrated in FIG. 5 illustrates an example of the quantized coefficients. The block illustrated in FIG. 5 may be a 4×4 transform block, or a 4×4 sub-block of a 8×8, 16×16, 32×32, or 64×64 transform block. The 4×4 block illustrated in FIG. 5 may represent a luma block or a chroma block. The encoding result of the inversely diagonally scanned coefficients illustrated in FIG. 5 may be, for example, as expressed by Table 3. In Table 3, the scan_pos represents the position of the coefficient according to the inverse diagonal scan. The scan_pos 15 represents a coefficient which is first scanned, that is, of the bottom right corner in the 4×4 block, and the scan_pos 0 represents a coefficient which is lastly scanned, that is, of the top left corner. Meanwhile, in an embodiment, the scan_pos may also be referred to as a scan position. For example, the scan_pos 0 may be referred to as a scan position 0.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag |  |  |  |  | 0 | 0 |  | 1 |  | 0 | 1 | 0 | 1 | 1 | 0 | 1 |
| rem_abs_gt1_flag |  |  |  |  | 0 | 0 |  | 0 |  | 1 | 0 | 1 | 1 | 1 | 1 | 1 |
| rem_abs_gt2_flag |  |  |  |  |  |  |  |  |  | 0 |  | 0 | 0 | 1 | 1 | 1 |
| abs_remainder |  |  |  |  |  |  |  |  |  |  |  |  |  | 0 | 1 | 2 |
| ceoff_sign_flag |  |  |  |  | 0 | 1 |  | 0 |  | 0 | 1 | 1 | 0 | 0 | 1 | 0 |

As described in Table 1, in an embodiment, primary syntax elements in units of 4×4 sub-block may include sig_coeff_flag, par_level_flag, rem_abs_gt1_flag, rem_abs_gt2_flag, abs_remainder, coeff_sign_flag, and the like. Among them, the sig_coeff_flag, the par_level_flag, the rem_abs_gt1_flag, and the rem_abs_gt2_flag may represent context-encoded bins which are encoded by using the regular encoding engine, and the abs_remainder and the coeff_sign_flag may represent bypass bins which are encoded by using the bypass encoding engine.

The context-encoded bin may represent high data dependency because it uses the probability state and range which are updated while processing the previous bin. That is, since for the context-encoded bin, the next bin may be encoded/decoded after the current bin is all encoded/decoded, it may be difficult to conduct a parallel processing. Further, it may also take a long time to read the probability section and to determine the current state. Accordingly, an embodiment may propose a method for improving CABAC throughput by reducing the number of context-encoded bins and increasing the number of bypass bins.

In an embodiment, coefficient level information may be encoded in an inverse scanning order. That is, the coefficient level information may be encoded after being scanned toward the coefficients in the top left starting from the coefficients in the bottom right of the unit block. In an example, the coefficient level which is first scanned in the inverse scanning order may represent a small value. Signaling the par_level_flag, the rem_abs_gt1_flag, and the rem_abs_gt2_flag for such first scanned coefficients may reduce the length of binarized bins for representing the coefficient level, and the respective syntax elements may be efficiently encoded through arithmetic coding based on the previously encoded context by using a predetermined context.

However, in the case of some coefficient levels having a large value, that is, coefficient levels positioned at the top left of the unit block, signaling the par_level_flag, the rem_abs_gt1_flag, and the rem_abs_gt2_flag may not help to improve compaction performance. The use of the par_level_flag, the rem_abs_gt1_flag, and the rem_abs_gt2_flag may also rather lower encoding efficiency.

In an embodiment, by quickly switching the syntax elements (par_level_flag, rem_abs_gt1_flag, and rem_abs_gt2_flag) encoded into the context-encoded bin to the abs_remainder syntax element which is encoded by using the bypass encoding engine, that is, encoded into the bypass bin, it is possible to reduce the number of context-encoded bins.

In an embodiment, the number of coefficients for encoding the rem_abs_gt2_flag may be limited. The maximum number of rem_abs_gt2_flags which are explicitly encoded within the 4×4 block may be 16. That is, the rem_abs_gt2_flag may also be encoded for all coefficients whose absolute value is larger than 2, and in an embodiment, the rem_abs_gt2_flag may be encoded only for the first N coefficients having the absolute value larger than 2 (that is, coefficients in which the rem_abs_gt1_flag is 1) according to the scanning order. The N may also be selected by the encoder, and may also be set as any value of 0 to 16. Table 4 shows an application example of the embodiment when the N is 1. According to an embodiment, the number of encoding times for the rem_abs_gt2_flag may be reduced as many as indicated by X in Table 4 below in the 4×4 block, thereby reducing the number of context-encoded bins. The abs_remainder values of the coefficients may be changed as expressed by Table 4 below with respect to the scan positions where the rem_abs_gt2_flag is not encoded when being compared to Table 3.

TABLE 4

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag |  |  |  |  | 0 | 0 |  | 1 |  | 0 | 1 | 0 | 1 | 1 | 0 | 1 |
| rem_abs_gt1_flag |  |  |  |  | 0 | 0 |  | 0 |  | 1 | 0 | 1 | 1 | 1 | 1 | 1 |
| rem_abs_gt2_flag |  |  |  |  |  |  |  |  |  | 0 |  | X | X | X | X | X |
| abs_remainder |  |  |  |  |  |  |  |  |  |  |  | 0 | 0 | 1 | 2 | 3 |
| ceoff_sign_flag |  |  |  |  | 0 | 1 |  | 0 |  | 0 | 1 | 1 | 0 | 0 | 1 | 0 |

In an embodiment, the number of coefficients which is encoded with the rem_abs_gt1_flag may be limited. The maximum number of rem_abs_gt2_flags which are explicitly encoded within the 4×4 block may be 16. That is, the rem_abs_gt1_flag may be encoded for all coefficients whose absolute value is larger than zero, and in an embodiment, the rem_abs_gt1_flag may be encoded only for the first M coefficients having the absolute value larger than zero (that is, coefficients at which the sig_coeff_flag is 1) according to the scanning order. The M may also be selected by the encoder, and may also be set as any value of 0 to 16. Table 5 shows an application example of the embodiment when the M is 4. If the rem_abs_gt1_flag is not encoded, the rem_abs_gt2_flag is not encoded either, such that the number of encoding times for the rem_abs_gt1_flag and the rem_abs_gt2_flag may be reduced as many as indicated by X in the 4×4 block according to the embodiment, thereby reducing the number of context-encoded bins. The values of the rem_abs_gt2_flag and the abs_remainder of coefficients may be changed as expressed by Table 6 below with respect to the scan positions where the rem_abs_gt1_flag is not encoded when being compared to Table 3. Table 6 shows an application example of the embodiment when the M is 8.

TABLE 5

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | X | X | X | X | X | X |
| rem_abs_gt2_flag | | | | | | | | | | 0 | | X | X | X | X | X |
| abs_remainder | | | | | | | | | | | 0 | 1 | 1 | 2 | 3 | 4 |
| ceoff_sign_flag | | | | | 0 | 1 | | 0 | | 0 | 1 | 1 | 0 | 0 | 1 | 0 |

TABLE 6

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | 0 | 1 | 1 | 1 | X | X |
| rem_abs_gt2_flag | | | | | | | | | | 0 | | 0 | 0 | 1 | X | X |
| abs_remainder | | | | | | | | | | | | | | 0 | 3 | 4 |
| ceoff_sign_flag | | | | | 0 | 1 | | 0 | | 0 | 1 | 1 | 0 | 0 | 1 | 0 |

In an embodiment, the aforementioned embodiments which limit the number of rem_abs_gt1_flags and the number of rem_abs_gt2_flags, respectively, may be combined. All of the M representing the limit of the number of rem_abs_gt1_flags and the N representing the limit of the number of rem_abs_gt2_flags may have values from 0 to 16, but the N may be equal to the M or smaller than the M. Table 7 shows an application example of the present embodiment when the M is 8 and the N is 1. Since the corresponding syntax element is not encoded at the positions marked with X, the number of context-encoded bins may be reduced.

TABLE 7

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | 0 | 1 | 1 | 1 | X | X |
| rem_abs_gt2_flag | | | | | | | | | | 0 | | X | X | X | X | X |
| abs_remainder | | | | | | | | | | | | 0 | 0 | 1 | 3 | 4 |
| ceoff_sign_flag | | | | | 0 | 1 | | 0 | | 0 | 1 | 1 | 0 | 0 | 1 | 0 |

In an embodiment, the number of coefficients which encode the par_level_flag may be limited. The maximum number of par_level_flags which are explicitly encoded within the 4×4 block may be 16. That is, the par_level_flag may be encoded for all coefficients whose absolute value is larger than zero, and in an embodiment, the par_level_flag may be encoded only for the first L coefficients having the absolute value larger than zero (that is, coefficients at which the sig_coeff_flag is 1) according to the scanning order. The L may also be selected by the encoder, and may also be set as any value of 0 to 16. Table 8 shows an application example of the embodiment when the L is 8. According to the embodiment, the number of encoding times for the par_level_flag may be reduced by the number indicated by X in the 4×4 block, thereby reducing the number of context-encoded bins. The values of the rem_abs_gt1_flag, the rem_abs_gt2_flag, and the abs_remainder of the coefficients may be changed as expressed by Table 8 below with respect to the scan positions where the par_level_flag is not encoded when being compared to Table 3.

TABLE 8

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | 1 | 1 |
| rem_abs_gt2_flag | | | | | | | | | | 0 | | 0 | 0 | 1 | 1 | 1 |
| abs_remainder | | | | | | | | | | | | | | 0 | 4 | 7 |
| ceoff_sign_flag | | | | | | 0 | | 1 | | 0 | | 0 | 1 | 1 | 0 | 0 | 1 | 0 |

In an embodiment, the aforementioned embodiments which limit the number of par_level_flags and the number of rem_abs_gt2_flags may be combined. All of the L representing the limit of the number of par_level_flags and the N representing the limit of the number of rem_abs_gt2_flags may have values from 0 to 16. Table 9 shows an application example of the present embodiment when the L is 8 and the N is 1. Since the corresponding syntax element is not encoded at the positions marked with X, the number of context-encoded bins may be reduced.

TABLE 9

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | 1 | 1 |
| rem_abs_gt2_flag | | | | | | | | | | 0 | | X | X | X | X | X |
| abs_remainder | | | | | | | | | | | | 0 | 0 | 1 | 5 | 8 |
| ceoff_sign_flag | | | | | | 0 | | 1 | | 0 | | 0 | 1 | 1 | 0 | 0 | 1 | 0 |

In an embodiment, the aforementioned embodiments which limit the number of par_level_flags and rem_abs_gt1_flags may be combined. All of the L representing the limit of the number of par_level_flags and the M representing the limit of the number of rem_abs_gt1_flags may have values of 0 to 16. Table 10 shows an application example of the present embodiment when the L is 8 and the M is 8. Since the corresponding syntax element is not encoded at the positions marked with X, the number of context-encoded bins may be reduced.

TABLE 10

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | X | X |
| rem_abs_gt2_flag | | | | | | | | | | 0 | | 0 | 0 | 1 | X | X |
| abs_remainder | | | | | | | | | | | | | | 0 | 6 | 9 |
| ceoff_sign_flag | | | | | | 0 | | 1 | | 0 | | 0 | 1 | 1 | 0 | 0 | 1 | 0 |

In an embodiment, the aforementioned embodiments which limit the number of par_level_flags, the number of rem_abs_gt1_flags, and the number of rem_abs_gt2_flags, respectively, may be combined. All of the L representing the limit of the number of par_level_flags, the M representing the limit of the number of rem_abs_gt1_flags, and the N representing the limit of the number of rem_abs_gt2_flags may have values from 0 to 16, but the N may be equal to the M or smaller than the M. Table 11 shows an application example of the present embodiment when the L is 8, the M is 8, and the N is 1. Since the corresponding syntax element is not encoded at positions marked with X, the number of context-encoded bins may be reduced.

TABLE 11

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | X | X |
| rem_abs_gt2_flag | | | | | | | | | | 0 | | X | X | X | X | X |
| abs_remainder | | | | | | | | | | | | 0 | 0 | 1 | 6 | 9 |
| ceoff_sign_flag | | | | | 0 | 1 | | 0 | | 0 | 1 | 1 | 0 | 0 | 1 | 0 |

An embodiment may propose a method for limiting the sum of the number of sig_coeff_flags, the number of par_level_flags, and the number of rem_abs_gt1_flags. Assuming that the sum of the number of sig_coeff_flags, the number of par_level_flags, and the number of rem_abs_gt1_flags is limited to K, the K may have a value of 0 to 48. In the present embodiment, if the sum of the number of sig_coeff_flags, the number of par_level_flags, and the number of rem_abs_gt1_flags exceeds the K and the sig_coeff_flag, the par_level_flag, and the rem_abs_gt1_flag are not encoded, the rem_abs_gt2_flag may not be encoded either. Table 12 shows a case where the K is limited to 30.

TABLE 12

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | X | X |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | X | X |
| rem_abs_gt2_flag | | | | | | | | | | 0 | | 0 | 0 | 1 | X | X |
| abs_remainder | | | | | | | | | | | | | | 0 | 7 | 10 |
| ceoff_sign_flag | | | | | 0 | 1 | | 0 | | 0 | 1 | 1 | 0 | 0 | 1 | 0 |

In an embodiment, the method for limiting the sum of the number of sig_coeff_flags, the number of par_level_flags, and the number of rem_abs_gt1_flags and the aforementioned method for limiting the number of rem_abs_gt2_flags may be combined. Assuming that the sum of the number of sig_coeff_flags, the number of par_level_flags, and the number of rem_abs_gt1_flags is limited to K and the number of rem_abs_gt2_flags is limited to N, the K may have a value of 0 to 48, and the N may have a value of 0 to 16. Table 13 shows a case where the K is limited to 30 and the N is limited to 2.

TABLE 13

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | X | X |
| par_level_flag | | | | | 0 | 0 | | 1 | | 0 | 1 | 0 | 1 | 1 | X | X |
| rem_abs_gt1_flag | | | | | 0 | 0 | | 0 | | 1 | 0 | 1 | 1 | 1 | X | X |
| rem_abs_gt2_flag | | | | | | | | | | 0 | | 0 | X | X | X | X |
| abs_remainder | | | | | | | | | | | | | 0 | 1 | 7 | 10 |
| ceoff_sign_flag | | | | | 0 | 1 | | 0 | | 0 | 1 | 1 | 0 | 0 | 1 | 0 |

In an embodiment, encoding may be performed in the order of the par_level_flag and the rem_abs_gt1_flag, but in an embodiment according to the present disclosure, encoding may be performed in the order of the rem_abs_gt1_flag and the par_level_flag by changing the encoding order. As described above, if the encoding order of the par_level_flag and the rem_abs_gt1_flag is changed, the rem_abs_gt1_flag is encoded after the sig_coeff_flag is encoded, and the par_level_flag may be encoded only when the rem_abs_gt1_flag is 1. Accordingly, the relationship between the actual transform coefficient value (coeff) and the respective syntax elements may be changed as expressed by Equation 5 below. Table 14 below shows an example of the case where the encoding order of the par_level_flag and the rem_abs_gt1_flag is changed. When being compared to Table 2, in Table 14 below, if the |coeff| is 1, the par_level_flag is not encoded, such that it is advantageous in terms of throughput and encoding. Of course, in Table 14, if the |coeff| is 2, the rem_abs_gt2_flag is required to be encoded unlike in Table 2, and if the |coeff| is 4, the abs_remainder is required to be encoded unlike in Table 2, but the case where the |coeff| is 1 may occur more than the case where the |coeff| is 2 or 4, such that the method according to Table 14 may exhibit higher throughput and encoding performance than the method according to Table 2. The result of encoding the 4×4 sub-block as illustrated in FIG. 5 may be expressed by Table 15 below.

$$|coeff|=sig\_coeff\_flag+rem\_abs\_gt1\_flag+par\_level\_flag+2*(rem\_abs\_gt2\_flag+abs\_remainder) \quad \text{Equation 5}$$

TABLE 14

| |coeff| | sig_coeff_flag | rem_abs_gt1_flag | par_level_flag | rem_abs_gt2_flag | abs_remainder |
|---|---|---|---|---|---|
| 0 | 0 | | | | |
| 1 | 1 | 0 | | | |
| 2 | 1 | 1 | 0 | 0 | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | ... | ... |

TABLE 15

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | 1 | 1 |
| rem_abs_gt1_flag | | | | | 0 | 0 | | 1 | | 1 | 1 | 1 | 1 | 1 | 1 | 1 |
| par_level_flag | | | | | | | | 0 | | 1 | 0 | 1 | 0 | 0 | 1 | 0 |
| rem_abs_gt2_flag | | | | | | | | 0 | | 0 | 0 | 0 | 1 | 1 | 1 | 1 |
| abs_remainder | | | | | | | | | | | | | 0 | 1 | 1 | 3 |
| ceoff_sign_flag | | | | | 0 | 1 | | 0 | | 0 | 1 | 1 | 0 | 0 | 1 | 0 |

In an embodiment, when the encoding is performed in the order of the sig_coeff_flag, the rem_abs_gt1_flag, the par_level_flag, the rem_abs_gt2_flag, the abs_remainder, and the coeff_sign_flag, the present disclosure may propose a method for limiting the sum of the number of sig_coeff_flags, the number of rem_abs_gt1_flags, and the number of par_level_flags. If the sum of the number of sig_coeff_flags, the number of rem_abs_gt1_flags, and the number of par_level_flags is limited to K, the K may have a value of 0 to 48. In the present embodiment, when the sig_coeff_flag, the rem_abs_gt1_flag, and the par_level_flag are no longer encoded, the rem_abs_gt2_flag may not be encoded either. Table 16 shows a case where the K is limited to 25.

TABLE 16

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | X | X | X |
| rem_abs_gt1_flag | | | | | 0 | 0 | | 1 | | 1 | 1 | 1 | 1 | X | X | X |
| par_level_flag | | | | | | | | 0 | | 1 | 0 | 1 | 0 | X | X | X |
| rem_abs_gt2_flag | | | | | | | | 0 | | 0 | 0 | 0 | 1 | X | X | X |
| abs_remainder | | | | | | | | | | | | | 0 | 6 | 7 | 10 |
| ceoff_sign_flag | | | | | 0 | 1 | | 0 | | 0 | 1 | 1 | 0 | 0 | 1 | 0 |

In an embodiment, the sig_coeff_flag, the rem_abs_gt1_flag, and the par_level_flag may be encoded in one for loop within the (residual) syntax. Although the sum of the number of three syntax elements (sig_coeff_flag, rem_abs_gt1_flag, and par_level_flag) does not exceed the K and the sum of the number of three syntax elements does not exactly match the K, the encoding may be stopped at the same scan position. Table 17 below shows a case where the K is limited to 27. When the encoding is performed up to a scan position 3, the sum of the number of sig_coeff_flags, the number of rem_abs_gt1_flags, and the number of par_level_flags is 25. The sum is a value which does not exceed the K, but at this time, since the encoding apparatus does not know the value of the coefficient level of the scan_pos 2, which is the next scan position, the encoding apparatus does not know which value the number of context-encoded bins generated in the scan_pos 2 has from 1 to 3. Accordingly, the encoding apparatus may encode only up to the scan_pos 3 and terminate the encoding. The K values are different, but the encoding results may be the same expressed by Tables 16 and 17 below.

TABLE 17

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | X | X | X |
| rem_abs_gt1_flag | | | | | 0 | 0 | | 1 | | 1 | 1 | 1 | 1 | X | X | X |
| par_level_flag | | | | | | | | 0 | | 1 | 0 | 1 | 0 | X | X | X |
| rem_abs_gt2_flag | | | | | | | | 0 | | 0 | 0 | 0 | 1 | X | X | X |
| abs_remainder | | | | | | | | | | | | | 0 | 6 | 7 | 10 |
| ceoff_sign_flag | | | | | 0 | 1 | | 0 | | 0 | 1 | 1 | 0 | 0 | 1 | 0 |

An embodiment may propose a method for changing the encoding order of the par_level_flag and the rem_abs_gt1_flag, and limiting the number of rem_abs_gt2_flags. That is, the encoding may be performed in the order of the sig_coeff_flag, the rem_abs_gt1_flag, the par_level_flag, the rem_abs_gt2_flag, the abs_remainder, and the coeff_sign_flag, and the number of coefficients encoded with the rem_abs_gt2_flag may be limited.

The maximum number of rem_abs_gt2_flags which are explicitly encoded within the 4×4 block is 16. That is, the rem_abs_gt2_flag may be encoded for all coefficients whose absolute value is larger than 2. Conversely, in the present embodiment, the rem_abs_gt2_flag may be encoded only for the first N coefficients having the absolute value larger than 2 (that is, coefficients at which the rem_abs_gt1_flag is 1) in the scanning order. The N may also be selected by the encoder, and may also be set as any value of 0 to 16. Table 18 below shows an application example of the present embodiment when the N is 1. The number of encoding times for the rem_abs_gt2_flag may be reduced as many as indicated by X in the 4×4 block, thereby reducing the number of context-encoded bins. The abs_remainder values of the coefficients may be changed as expressed by Table 18 with respect to the scan positions where the rem_abs_gt2_flag is not encoded when being compared to Table 15.

TABLE 18

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| rem_abs_gt1_flag | | | | | 0 | 0 | | 1 | | 1 | 1 | 1 | 1 | 1 | 1 | 1 |
| par_level_flag | | | | | | | | 0 | | 1 | 0 | 1 | 0 | 0 | 1 | 0 |
| rem_abs_gt2_flag | | | | | | | | 0 | | 0 | X | X | X | X | X | X |
| abs_remainder | | | | | | | | | | | 0 | 0 | 1 | 2 | 2 | 4 |
| ceoff_sign_flag | | | | | 0 | 1 | | 0 | | 0 | 1 | 1 | 0 | 0 | 1 | 0 |

An embodiment may provide a method for changing the encoding order of the par_level_flag and the rem_abs_gt1_flag, and limiting the sum of the number of sig_coeff_flags, the number of rem_abs_gt1_flags, and the number of par_level_flags, and the number of rem_abs_gt2_flags, respectively. In an example, when the encoding is performed in the order of the sig_coeff_flag, the rem_abs_gt1_flag, the par_level_flag, the rem_abs_gt2_flag, the abs_remainder, and the coeff_sign_flag, a method for limiting the sum of the number of sig_coeff_flags, the number of rem_abs_gt1_flags, and the number of par_level_flags and the aforementioned method for limiting the number of rem_abs_gt2_flags may be combined. Assuming that the sum of the number of sig_coeff_flags, the number of rem_abs_gt1_flags, and the number of par_level_flags is limited to K and the number of rem_abs_gt2_flags is limited to N, the K may have a value of 0 to 48, and the N may have a value of 0 to 16. Table 19 shows a case where the K is limited to 25 and the N is limited to 2.

TABLE 19

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | X | X | X |
| rem_abs_gt1_flag | | | | | 0 | 0 | | 1 | | 1 | 1 | 1 | 1 | X | X | X |
| par_level_flag | | | | | | | | 0 | | 1 | 0 | 1 | 0 | X | X | X |
| rem_abs_gt2_flag | | | | | | | | 0 | | 0 | X | X | X | X | X | X |
| abs_remainder | | | | | | | | | | | 0 | 0 | 1 | 6 | 7 | 10 |
| ceoff_sign_flag | | | | | 0 | 1 | | 0 | | 0 | 1 | 1 | 0 | 0 | 1 | 0 |

Figure 6:
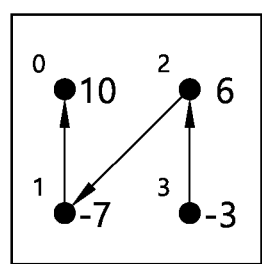
FIG. 6 is a diagram illustrating an example of transform coefficients within a 2×2 block.

FIG. 6 is a diagram illustrating an example of transform coefficients within a 2×2 block.

The 2×2 block illustrated in FIG. 6 represents an example of quantized coefficients. The block illustrated in FIG. 6 may be a 2×2 transform block, or a 2×2 sub-block of a 4×4, 8×8, 16×16, 32×32, or 64×64 transform block. The 2×2 block illustrated in FIG. 6 may represent a luma block or a chroma block. The encoding result of the inversely diagonally scanned coefficients illustrated in FIG. 6 may be expressed, for example, expressed by Table 20. In Table 20, the scan_pos represents the position of the coefficient according to the inverse diagonal scan. The scan_pos 3 represents a coefficient which is first scanned, that is, of the bottom right corner in the 2×2 block, and the scan_pos 0 represents a coefficient which is lastly scanned, that is, of the top left corner.

TABLE 20

| scan_pos | 3 | 2 | 1 | 0 |
|---|---|---|---|---|
| coefficients | 4 | 6 | -7 | 10 |
| sig_coeff_flag | 1 | 1 | 1 | 1 |
| par_level_flag | 1 | 1 | 0 | 1 |
| rem_abs_gt1_flag | 1 | 1 | 1 | 1 |
| rem_abs_gt2_flag | 0 | 1 | 1 | 1 |
| abs_remainder | | 0 | 1 | 2 |
| ceoff_sign_flag | 0 | 0 | 1 | 0 |

As expressed by Table 1, in an embodiment, primary syntax elements in units of 2×2 sub-block may include the sig_coeff_flag, the par_level_flag, the rem_abs_gt1_flag, the rem_abs_gt2_flag, the abs_remainder, the coeff_sign_flag, and the like. Among them, the sig_coeff_flag, the par_level_flag, the rem_abs_gt1_flag, and the rem_abs_gt2_flag may represent context-encoded bins which are encoded by using the regular encoding engine, and the abs_remainder and the coeff_sign_flag may represent bypass bins which are encoded by using the bypass encoding engine.

The context-encoded bin may exhibit high data dependency because it uses the probability state and range which are updated while processing the previous bin. That is, since for the context-encoded bin, the next bin may be encoded/decoded after the current bin is all encoded/decoded, it may be difficult to conduct a parallel processing. Further, it may take a long time to read the probability section and to determine the current state. Accordingly, an embodiment may propose a method for improving the CABAC throughput by reducing the number of context-encoded bins and increasing the number of bypass bins.

In an embodiment, coefficient level information may be encoded in the inverse scanning order. That is, the coefficient level information may be encoded after being scanned toward the coefficients in the top leftstarting from the coefficients in the bottom right of the unit block. In an example, the coefficient level which is first scanned in the inverse scanning order may represent a small value. Signaling the par_level_flag, the rem_abs_gt1_flag, and the rem_abs_gt2_flag for such first scanned coefficients may reduce the length of binarized bins for representing the coefficient level, and the respective syntax elements may be efficiently encoded through arithmetic coding based on the previously encoded context by using a predetermined context.

However, in the case of some coefficient levels having a large value, that is, the coefficient levels which are positioned at the top left of the unit block, signaling the par_level_flag, the rem_abs_gt1_flag, and rem_abs_gt2_flag may not help to improve compaction performance. The use of the par_level_flag, the rem_abs_gt1_flag, and the rem_abs_gt2_flag may rather lower encoding efficiency.

In an embodiment, by quickly switching the syntax elements (par_level_flag, rem_abs_gt1_flag, and rem_abs_gt2_flag) encoded into the context-encoded bin to the abs_remainder syntax element encoded by using the bypass encoding engine, that is, encoded into the bypass bin, it is possible to reduce the number of context-encoded bins.

In an embodiment, the number of coefficients encoded with the rem_abs_gt2_flag may be limited. The maximum number of rem_abs_gt2_flags which are explicitly encoded within the 2×2 block may be 4. That is, the rem_abs_gt2_flag may also be encoded for all coefficients whose absolute value is larger than 2, and in an embodiment, the rem_abs_gt2_flag may be encoded only for the first N coefficients having the absolute value larger than 2 (that is, coefficients at which the rem_abs_gt1_flag is 1) according to the scanning order. The N may also be selected by the encoder, and may also be set as any value of 0 to 4. Assuming that the context-encoded bin for a luma or chroma 4×4 sub-block is limited in the encoder by a method similar to that of the present embodiment, the N may also be calculated by using the limit value used. As a method for calculating the N, the limit value ($N_{4\times4}$) of the context-encoded bin for the luma or chroma 4×4 sub-block is used as it is as expressed by Equation 6, or the number of pixels in the 2×2 sub-block is 4, such that the N may be calculated through Equation 7. Here, a and b mean constants, and are not limited to specific values in the present disclosure.

Similarly, the N may also be calculated by using a horizontal/vertical size value of the sub-block. Since the sub-block has a square shape, the horizontal size value and the vertical size value are the same. Since the horizontal or vertical size value of the 2×2 sub-block is 2, the N may be calculated through Equation 8.

$$N=N_{4\times4} \qquad \text{Equation 6}$$

$$N=\{N_{4\times4}>>(4-a)\}+b \qquad \text{Equation 7}$$

$$N=\{N_{4\times4}>>(a-2)\}+b \qquad \text{Equation 8}$$

Table 21 shows an application example of the present embodiment when the N is 1. The number of encoding times for the rem_abs_gt2_flag may be reduced as many as indicated by X in the 2×2 block, thereby reducing the number of context-encoded bins. The abs_remainder values of coefficients for the scan positions where the rem_abs_gt2_flag is not encoded are changed as expressed by Table 21 below when being compared to Table 20.

TABLE 21

| scan_pos | 3 | 2 | 1 | 0 |
|---|---|---|---|---|
| coefficients | 4 | 6 | −7 | 10 |
| sig_coeff_flag | 1 | 1 | 1 | 1 |
| par_level_flag | 1 | 1 | 0 | 1 |
| rem_abs_gt1_flag | 1 | 1 | 1 | 1 |
| rem_abs_gt2_flag | 0 | X | X | X |
| abs_remainder | | 1 | 2 | 3 |
| ceoff_sign_flag | 0 | 0 | 1 | 0 |

In the encoding of the 2×2 sub-block of the chroma block according to an embodiment, the sum of the number of sig_coeff_flags, the number of par_level_flags, and the number of rem_abs_gt1_flags may be limited. Assuming that the sum of the number of sig_coeff_flags, the number of par_level_flags, and the number of rem_abs_gt1_flags is limited to K, the K may have a value of 0 to 12. In the present embodiment, when the sum of the number of sig_coeff_flags, the number of par_level_flags, and the number of rem_abs_gt1_flags exceeds the K and the sig_coeff_flag, the par_level_flag, and the rem_abs_gt1_flag are not encoded, the rem_abs_gt2_flag may not be encoded either.

The K may also be selected by the encoder, and may be set as any value of 0 to 12. Assuming that the context-encoded bin for the luma or chroma 4×4 sub-block is limited in the encoder by a method similar to the present embodiment, the K may also be calculated by using the limit value used. As a method for calculating the K, the limit value ($K_{4\times4}$) of the context-encoded bin for the luma or chroma 4×4 sub-block is used as it is as expressed by Equation 9, or the number of pixels in the 2×2 sub-block is 4, such that the K may be calculated through Equation 10. Here, a and b mean constants, and are not limited to specific values in the present disclosure.

Similarly, the K may also be calculated by using the horizontal/vertical size value of the sub-block. Since the sub-block has a square shape, the horizontal size value and the vertical size value are the same. Since the horizontal or vertical size value of the 2×2 sub-block is 2, the K may be calculated through Equation 11.

$$K=K_{4\times4} \qquad \text{Equation 9}$$

$$K=\{K_{4\times4}>>(4-a)\}+b \qquad \text{Equation 10}$$

$$K=\{K_{4\times4}>>(a-2)\}+b \qquad \text{Equation 11}$$

Table 22 shows a case where the K is limited to 6.

TABLE 22

| scan_pos | 3 | 2 | 1 | 0 |
|---|---|---|---|---|
| coefficients | 4 | 6 | −7 | 10 |
| sig_coeff_flag | 1 | 1 | X | X |
| par_level_flag | 1 | 1 | X | X |
| rem_abs_gt1_flag | 1 | 1 | X | X |
| rem_abs_gt2_flag | 0 | 1 | X | X |
| abs_remainder | | | 7 | 10 |
| ceoff_sign_flag | 0 | 0 | 1 | 0 |

In an embodiment, a method for limiting the sum of the number of sig_coeff_flags, the number of par_level_flags, and the number of rem_abs_gt1_flags and the aforementioned method for limiting the number of rem_abs_gt2_flags may be combined. Assuming that the sum of the number of sig_coeff_flags, the number of par_level_flags, and the number of rem_abs_gt1_flags is limited to K and the number of rem_abs_gt2_flags is limited to N, the K may have a value of 0 to 12, and the N may have a value of 0 to 4.

The K and the N may also be determined by the encoder, and may be calculated based on the aforementioned methods with regard to Equations 6 to 11.

Table 23 shows a case where the K is limited to 6 and the N is limited to 1.

TABLE 23

| scan_pos | 3 | 2 | 1 | 0 |
|---|---|---|---|---|
| coefficients | 4 | 6 | −7 | 10 |
| sig_coeff_flag | 1 | 1 | X | X |
| par_level_flag | 1 | 1 | X | X |
| rem_abs_gt1_flag | 1 | 1 | X | X |
| rem_abs_gt2_flag | 0 | X | X | X |
| abs_remainder | | 1 | 7 | 10 |
| ceoff_sign_flag | 0 | 0 | 1 | 0 |

An embodiment may propose a method for changing the encoding order of the par_level_flag and the rem_abs_gt1_flag. More specifically, in the present embodiment, when the sub-block having the 2×2 size of the chroma block is encoded, the encoding may be performed in the order of the rem_abs_gt1_flag and the par_level_flag, rather than being encoded in the order of the par_level_flag and the rem_abs_gt1_flag. When the encoding order of the par_level_flag and the rem_abs_gt1_flag is changed, the rem_abs_gt1_flag is encoded after the sig_coeff_flag, and the par_level_flag may be encoded only when the rem_abs_gt1_flag is 1. Accordingly, the relationship between the actual transform coefficient value (coeff) and the respective syntax elements may be changed as expressed by Equation 12 below.

$$|coeff|=sig\_coeff\_flag+rem\_abs\_gt1\_flag+par\_level\_flag+2*(rem\_abs\_gt2\_flag+abs\_remainder) \qquad \text{Equation 12}$$

Table 24 below shows some examples related to Equation 12. When being compared to Table 2, according to Table 24, if the |coeff| is 1, the par_level_flag is not encoded, such that it may be advantageous in terms of throughput and encoding. Of course, if the |coeff| is 2, the rem_abs_gt2_flag is required to be encoded unlike in Table 2, and if the |coeff| is 4, the abs_remainder is required to be encoded unlike in Table 2, but since the case where the |coeff| is 1 occurs more than the case where the |coeff| is 2 or 4, the method according to Table 24 may exhibit higher throughput and encoding performance than the method according to Table 2. Table 25 shows the result of encoding the 4×4 sub-block as illustrated in FIG. 6.

TABLE 24

| |coeff| | sig_coeff_flag | rem_abs_gt1_flag | par_level_flag | rem_abs_gt2_flag | abs_remainder |
|---|---|---|---|---|---|
| 0 | 0 | | | | |
| 1 | 1 | 0 | | | |
| 2 | 1 | 1 | 0 | 0 | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | ... | ... |

TABLE 25

| scan_pos | 3 | 2 | 1 | 0 |
|---|---|---|---|---|
| coefficients | 4 | 6 | -7 | 10 |
| sig_coeff_flag | 1 | 1 | 1 | 1 |
| rem_abs_gt1_flag | 1 | 1 | 1 | 1 |
| par_level_flag | 0 | 0 | 1 | 0 |
| rem_abs_gt2_flag | 1 | 1 | 1 | 1 |
| abs_remainder | 0 | 1 | 1 | 3 |
| ceoff_sign_flag | 0 | 0 | 1 | 0 |

An embodiment may propose a method for changing the encoding order of the par_level_flag and the rem_abs_gt1_flag, and limiting the sum of the number of sig_coeff_flags, the number of rem_abs_gt1_flags, and the number of par_level_flags. For example, when the encoding is performed in the order of the sig_coeff_flag, the rem_abs_gt1_flag, the par_level_flag, the rem_abs_gt2_flag, the abs_remainder, and the coeff_sign_flag, the sum of the number of sig_coeff_flags, the number of rem_abs_gt1_flags, and the number of par_level_flags may be limited. Assuming that the sum of the number of sig_coeff_flags, the number of rem_abs_gt1_flags, and the number of par_level_flags is limited to K, the K may have a value of 0 to 12. The K may be selected by the encoder, and may be set as any value of 0 to 12. Further, the K may be calculated based on the aforementioned descriptions with regard to Equations 9 to 11.

In an embodiment, when the sig_coeff_flag, the rem_abs_gt1_flag, and the par_level_flag are no longer encoded, the rem_abs_gt2_flag may not be encoded either. Table 26 shows a case where the K is limited to 6.

TABLE 26

| scan_pos | 3 | 2 | 1 | 0 |
|---|---|---|---|---|
| coefficients | 4 | 6 | -7 | 10 |
| sig_coeff_flag | 1 | 1 | X | X |
| rem_abs_gt1_flag | 1 | 1 | X | X |
| par_level_flag | 0 | 0 | X | X |
| rem_abs_gt2_flag | 1 | 1 | X | X |

TABLE 26-continued

| scan_pos | 3 | 2 | 1 | 0 |
|---|---|---|---|---|
| abs_remainder | 0 | 1 | 7 | 10 |
| ceoff_sign_flag | 0 | 0 | 1 | 0 |

In an embodiment, the sig_coeff_flag, the rem_abs_gt1_flag, and the par_level_flag may be encoded in one for loop. Although the sum of the number of the three syntax elements (sig_coeff_flag, rem_abs_gt1_flag, and par_level_flag) does not exceed the K and the sum does not exactly match K, the encoding may be stopped at the same scan position. Table 27 shows a case where the K is limited to 8. When the encoding is performed up to the scan position 2 (scan_pos 2), the sum of the number of sig_coeff_flags, the number of rem_abs_gt1_flags, and the number of par_level_flags is 6. The sum is a value which does not exceed the K, but at this time, since the encoder does not know the value of the coefficient level of the next scan position 1 (scan_pos 1), the encoder does not know which value the number of context-encoded bins generated in the scan_pos 1 has from 1 to 3. Accordingly, the encoder may encode up to only the scan_pos 2 and terminate the encoding. Accordingly, the K values are different, but the encoding results may be the same in Tables 26 and 27.

TABLE 27

| scan_pos | 3 | 2 | 1 | 0 |
|---|---|---|---|---|
| coefficients | 4 | 6 | -7 | 10 |
| sig_coeff_flag | 1 | 1 | X | X |
| rem_abs_gt1_flag | 1 | 1 | X | X |
| par_level_flag | 0 | 0 | X | X |
| rem_abs_gt2_flag | 1 | 1 | X | X |
| abs_remainder | 0 | 1 | 7 | 10 |
| ceoff_sign_flag | 0 | 0 | 1 | 0 |

An embodiment may propose a method for changing the encoding order of the par_level_flag and the rem_abs_gt1_flag, and limiting the number of rem_abs_gt2_flags. For example, when the encoding is performed in the order of the sig_coeff_flag, the rem_abs_gt1_flag, the par_level_flag, the rem_abs_gt2_flag, the abs_remainder, and the coeff_sign_flag, the number of coefficients encoded with the rem_abs_gt2_flag may be limited.

In an embodiment, the maximum number of rem_abs_gt2_flags which are encoded within the 2×2 block is 4. That is, the rem_abs_gt2_flag may be encoded for all coefficients whose absolute value is larger than 2. Meanwhile, another embodiment may propose a method for encoding the rem_abs_gt2_flag only for the first N coefficients having the absolute value larger than 2 (that is, coefficients at which the rem_abs_gt1_flag is 1) according to the scanning order.

The N may also be selected by the encoder, and may also be set as any value of 0 to 4. Further, The N may be calculated by the aforementioned method with regard to Equations 6 to 8.

Table 28 shows an application example of the present embodiment when the N is 1. The number of encoding times for the rem_abs_gt2_flags may be reduced as many as indicated by X in the 4×4 block, thereby reducing the number of context-encoded bins. The abs_remainder values of coefficients may be changed as expressed by Table 28 below with respect to the scan positions where the rem_abs_gt2_flag is not encoded when being compared to Table 25.

TABLE 28

| scan_pos | 3 | 2 | 1 | 0 |
|---|---|---|---|---|
| coefficients | 4 | 6 | −7 | 10 |
| sig_coeff_flag | 1 | 1 | 1 | 1 |
| rem_abs_gt1_flag | 1 | 1 | 1 | 1 |
| par_level_flag | 0 | 0 | 1 | 0 |
| rem_abs_gt2_flag | 1 | X | X | X |
| abs_remainder | 0 | 2 | 2 | 4 |
| ceoff_sign_flag | 0 | 0 | 1 | 0 |

An embodiment may provide a method for changing the encoding order of the par_level_flag and the rem_abs_gt1_flag, and limiting the sum of the number of sig_coeff_flags, the number of rem_abs_gt1_flags, and the number of par_level_flags, and the number of rem_abs_gt2_flags, respectively. For example, when the encoding is performed in the order of the sig_coeff_flag, the rem_abs_gt1_flag, the par_level_flag, the rem_abs_gt2_flag, the abs_remainder, and the coeff_sign_flag, the method for limiting the sum of the number of sig_coeff_flags, the number of rem_abs_gt1_flags, and the number of par_level_flags and the method for limiting the number of rem_abs_gt2_flags may also be combined. Assuming that the sum of the number of sig_coeff_flags, the number of rem_abs_gt1_flags, and the number of par_level_flags is limited to K and the number of rem_abs_gt2_flags is limited to N, the K may have a value of 0 to 12, and the N may have a value of 0 to 4. The K and the N may also be selected by the encoder, and the K may be set as any value of 0 to 12 and the N may be set as any value of 0 to 4. Further, the K and the N may be calculated by the aforementioned method with regard to Equation 11 in Equation 6.

Table 29 below shows a case where the K is limited to 6 and the N is limited to 1.

TABLE 29

| scan_pos | 3 | 2 | 1 | 0 |
|---|---|---|---|---|
| coefficients | 4 | 6 | −7 | 10 |
| sig_coeff_flag | 1 | 1 | X | X |
| rem_abs_gt1_flag | 1 | 1 | X | X |
| par_level_flag | 0 | 0 | X | X |
| rem_abs_gt2_flag | 1 | X | X | X |
| abs_remainder | 0 | 2 | 7 | 10 |
| ceoff_sign_flag | 0 | 0 | 1 | 0 |

Figure 7:
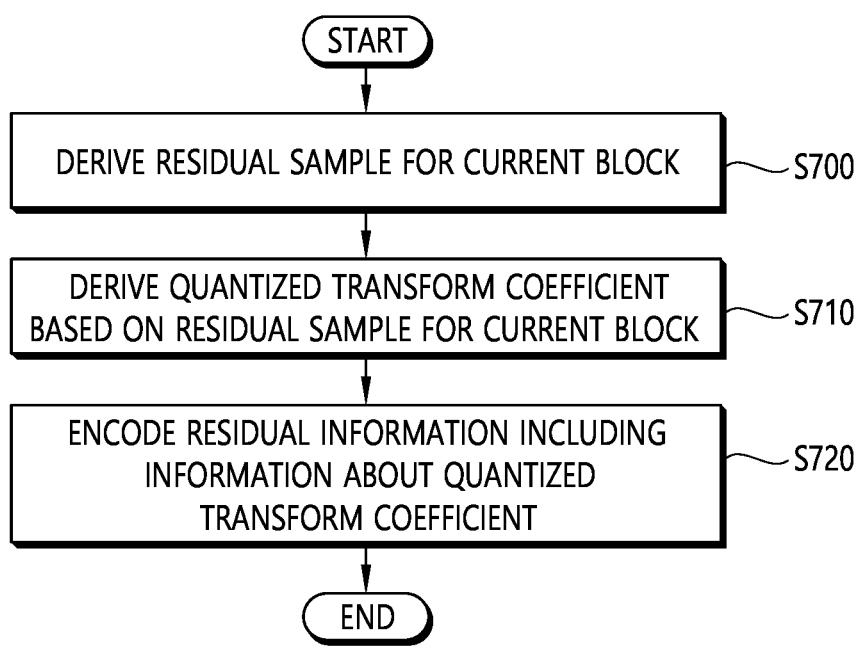
FIG. 7 is a flowchart illustrating an operation of the encoding apparatus according to an embodiment.
Figure 8:
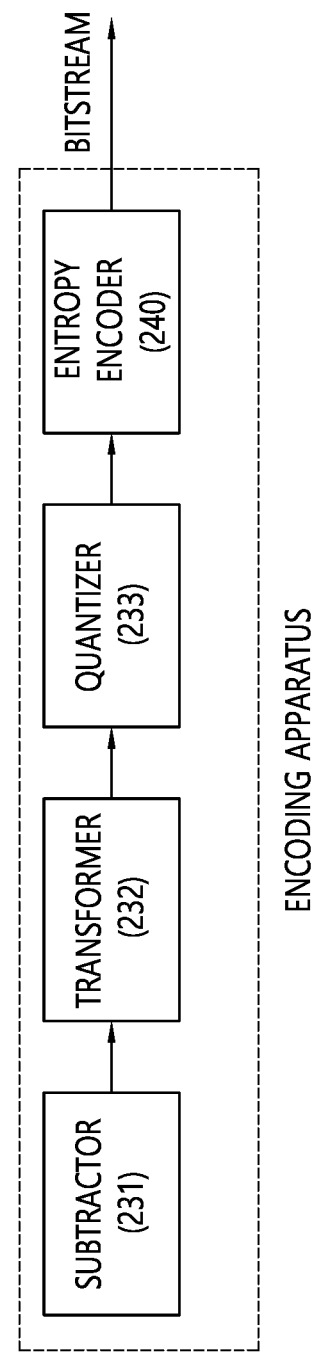
FIG. 8 is a block diagram illustrating a configuration of the encoding apparatus according to an embodiment.

FIG. 7 is a flowchart illustrating an operation of the encoding apparatus according to an embodiment, and FIG. 8 is a block diagram illustrating a configuration of the encoding apparatus according to an embodiment.

Figure 9:
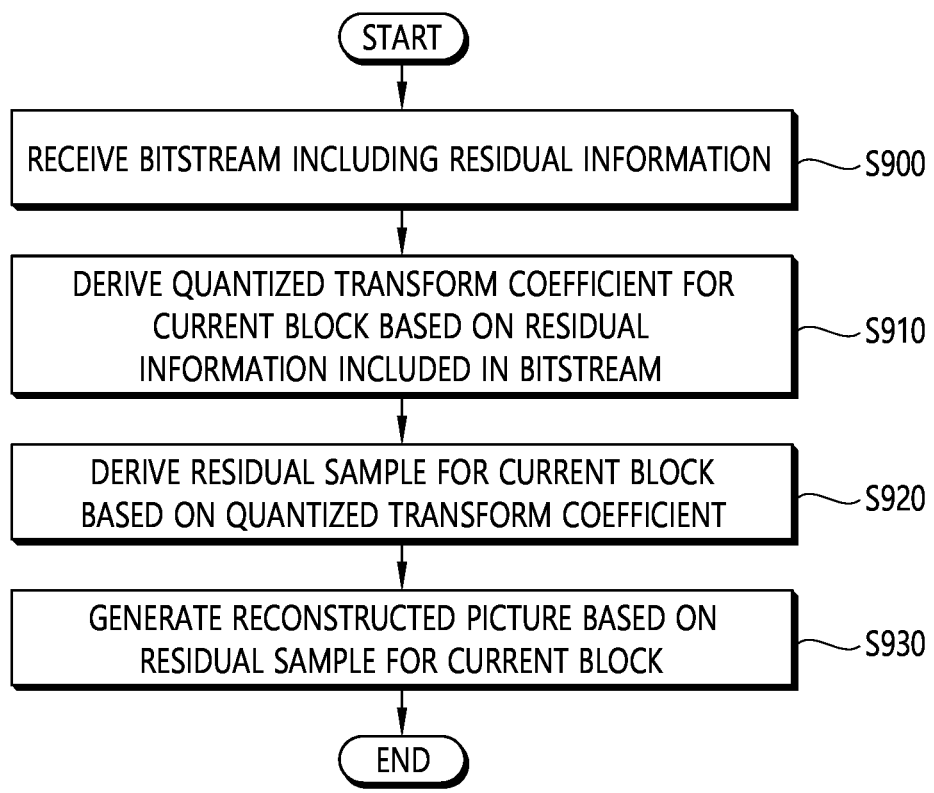
FIG. 9 is a flowchart illustrating an operation of the decoding apparatus according to an embodiment.
Figure 10:
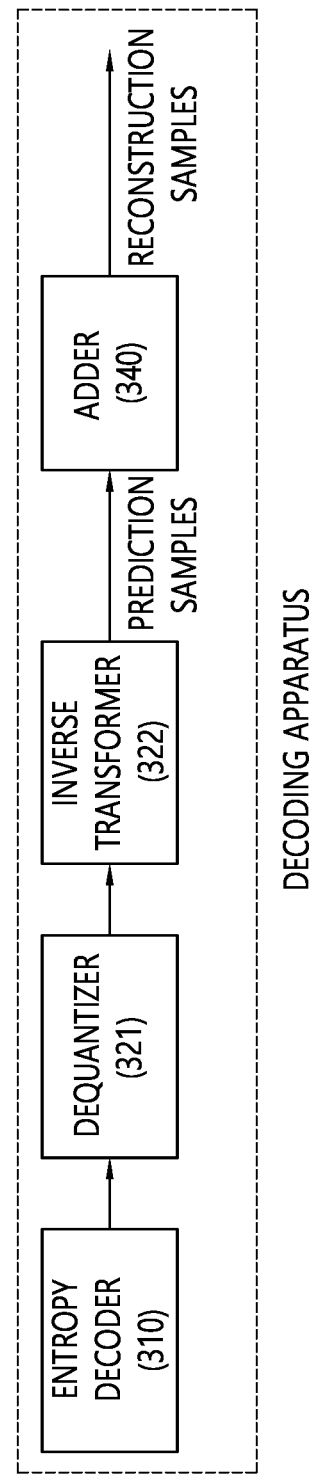
FIG. 10 is a block diagram illustrating a configuration of the decoding apparatus according to an embodiment.

The encoding apparatus according to FIGS. 7 and 8 may perform operations corresponding to a decoding apparatus according to FIGS. 9 and 10. Accordingly, operations of the decoding apparatus to be described later with reference to FIGS. 9 and 10 may also be applied to the encoding apparatus according to FIGS. 7 and 8 in the same manner.

Each step illustrated in FIG. 7 may be performed by the encoding apparatus 200 illustrated in FIG. 2. More specifically, S700 may be performed by the subtractor 231 illustrated in FIG. 2, S710 may be performed by the quantizer 233 illustrated in FIG. 2, and S720 may be performed by the entropy encoder 240 illustrated in FIG. 2. Further, the operations according to S700 to S720 are based on some of the aforementioned descriptions with reference to FIGS. 4 to 6. Accordingly, detailed descriptions which are overlapped with those described above with reference to FIGS. 2 and 4 to 6 will be omitted or simplified.

As illustrated in FIG. 8, the encoding apparatus according to an embodiment may include the subtractor 231, the transformer 232, the quantizer 233, and the entropy encoder 240. However, in some cases, all of the components illustrated in FIG. 8 may not be essential components of the encoding apparatus, and the encoding apparatus may be implemented by more or fewer components than those illustrated in FIG. 8.

In the encoding apparatus according to an embodiment, the subtractor 231, the transformer 232, the quantizer 233, and the entropy encoder 240 may be implemented as separate chips, respectively, or at least two components may also be implemented through a single chip.

The encoding apparatus according to an embodiment may derive a residual sample for a current block (S700). More specifically, the subtractor 231 of the encoding apparatus may derive the residual sample for the current block.

The encoding apparatus according to an embodiment may derive a quantized transform coefficient based on the residual sample for the current block (S710). More specifically, the quantizer 233 of the encoding apparatus may derive the quantized transform coefficient based on the residual sample for the current block.

The encoding apparatus according to an embodiment may encode residual information including information about the quantized transform coefficient (S720). More specifically, the entropy encoder 240 of the encoding apparatus may encode the residual information including the information about the quantized transform coefficient.

In an embodiment, the residual information may include a parity level flag for a parity of a transform coefficient level for the quantized transform coefficient and a first transform coefficient level flag about whether the transform coefficient level is larger than a first threshold. In an example, the parity level flag may represent par_level_flag, the first transform coefficient level flag may represent rem_abs_gt1_flag or abs_level_gtx_flag [n] [0], and the second transform coefficient level flag may represent rem_abs_gt2_flag or abs_level_gtx_flag [n] [1].

In an embodiment, encoding the residual information may include deriving a value of the parity level flag and a value of the first transform coefficient level flag based on the quantized transform coefficient, and encoding the first transform coefficient level flag and encoding the parity level flag.

In an embodiment, the encoding of the first transform coefficient level flag may be performed prior to the encoding of the parity level flag. For example, the encoding apparatus may perform the encoding for the rem_abs_gt1_flag or the abs_level_gtx_flag [n] [0] prior to the encoding for the par_level_flag.

In an embodiment, the residual information may further include a significant coefficient flag representing whether the quantized transform coefficient is a non-zero significant coefficient and a second transform coefficient level flag about whether the transform coefficient level of the quantized transform coefficient is larger than a second threshold. In an example, the significant coefficient flag may represent sig_coeff_flag.

In an embodiment, the sum of the number of significant coefficient flags for the quantized transform coefficients within the current block, the number of first transform coefficient level flags, the number of parity level flags, and the number of second transform coefficient level flags, which are included in the residual information, may be a predetermined threshold or less. In an example, the sum of the number of significant coefficient flags for the quantized transform coefficients related to the current sub-block within the current block, the number of first transform coefficient level flags, the number of parity level flags, and the number of second transform coefficient level flags may be limited to the predetermined threshold or less.

In an embodiment, the predetermined threshold may be determined based on the size of the current block (or the current sub-block within the current block).

In an embodiment, the sum of the number of significant coefficient flags, the number of first transform coefficient level flags, and the number of parity level flags, which are included in the residual information, is a third threshold or less, the number of second transform coefficient level flags included in the residual information is a fourth threshold or less, and the predetermined threshold may represent the sum of the third threshold and the fourth threshold.

In an example, if the size of the current block or the current sub-block within the current block is 4×4, the third threshold may represent K, and at this time, the K may represent one value of 0 to 48. Further, the fourth threshold may represent N, and at this time, the N may represent one value of 0 to 16.

In another example, if the size of the current block or the current sub-block within the current block is 2×2, the third threshold may represent the K, and at this time, the K may represent one value of 0 to 12. Further, the fourth threshold may represent the N, and at this time, the N may represent one value of 0 to 4.

In an embodiment, if the sum of the number of significant coefficient flags, the number of first transform coefficient level flags, the number of parity level flags, and the number of second transform coefficient level flags, which are derived based on the 0th quantized transform coefficient to the nth quantized transform coefficient determined by the coefficient scanning order, reaches a predetermined threshold, an explicit signaling of the significant coefficient flag, the first transform coefficient level flag, the parity level flag, and the second transform coefficient level flag is omitted with respect to the (n+1)th quantized transform coefficients determined by the coefficient scanning order, and a value of the (n+1)th quantized transform coefficient may be derived based on the value of the coefficient level information which is included in the residual information.

For example, if the sum of the number of sig_coeff_flags, the number of rem_abs_gt1_flags (or abs_level_gtx_flags [n] [0]), the number of par_level_flags, and the number of rem_abs_gt2_flags (or abs_level_gtx_flags [n] [1]), which are derived based on the 0th quantized transform coefficient (or first quantized transform coefficient) to the nth quantized transform coefficient (or nth quantized transform coefficient) determined by the coefficient scanning order, reaches the predetermined threshold, an explicit signaling of the sig_coeff_flag, the rem_abs_gt1_flag (or abs_level_gtx_flag [n] [0]), the par_level_flag, the abs_level_gtx_flag [n] [1], and the rem_abs_gt2_flag (or abs_level_gtx_flag [n] [1]) is omitted with respect to the (n+1)th quantized transform coefficient determined by the coefficient scanning order, and the value of the (n+1)th quantized transform coefficient may be derived based on a value of abs_remainder or the dec_abs_level which is included in the residual information.

In an embodiment, the significant coefficient flags, the first transform coefficient level flags, the parity level flags, and the second transform coefficient level flags, which are included in the residual information, are encoded based on the context, and the coefficient level information may be encoded on a bypass basis.

According to the encoding apparatus and the operation method of the encoding apparatus illustrated in FIGS. 7 and 8, the encoding apparatus derives a residual sample for a current block (S700), derives a quantized transform coefficient based on the residual sample for the current block (S710), and encodes residual information including information about the quantized transform coefficient (S720); and the residual information includes a parity level flag for a parity of the transform coefficient level for the quantized transform coefficient and a first transform coefficient level flag about whether the transform coefficient level is larger than a first threshold, and the encoding of the residual information includes deriving a value of the parity level flag and a value of the first transform coefficient level flag based on the quantized transform coefficient, and encoding the first transform coefficient level flag and encoding the parity level flag, and the encoding of the first transform coefficient level flag is performed prior to the encoding of the parity level flag. That is, according to the present disclosure, by determining (or changing) the decoding order of the parity level flag for the parity of the transform coefficient level for the quantized transform coefficient and the first transform coefficient level flag about whether the transform coefficient level is larger than the first threshold, it is possible to enhance coding efficiency.

FIG. 9 is a flowchart illustrating an operation of a decoding apparatus according to an embodiment, and FIG. 10 is a block diagram illustrating a configuration of the decoding apparatus according to an embodiment.

Each step illustrated in FIG. 9 may be performed by the decoding apparatus 300 illustrated in FIG. 3. More specifically, S900 and S910 may be performed by the entropy decoder 310 illustrated in FIG. 3, S920 may be performed by the dequantizer 321 and/or the inverse transformer 322 illustrated in FIG. 3, and S930 may be performed by the adder 340 illustrated in FIG. 3. Further, operations according to S900 to S930 are based on a part of the aforementioned descriptions with reference to FIGS. 4 to 6. Accordingly, detailed descriptions which are overlapped with those described above with reference to FIGS. 3 to 6 will be omitted or simplified.

As illustrated in FIG. 10, the decoding apparatus according to an embodiment may include the entropy decoder 310, the dequantizer 321, the inverse transformer 322, and the adder 340. However, in some cases, all components illustrated in FIG. 10 may not be an essential component of the decoding apparatus, and the decoding apparatus may be implemented by more or fewer components than those illustrated in FIG. 10.

In the decoding apparatus according to an embodiment, the entropy decoder 310, the dequantizer 321, the inverse transformer 322, and the adder 340 are implemented as separate chips, respectively, or at least two components may also be implemented through a single chip.

The decoding apparatus according to an embodiment may receive a bitstream including residual information (S900). More specifically, the entropy decoder 310 of the decoding apparatus may receive the bitstream including the residual information.

The decoding apparatus according to an embodiment may derive a quantized transform coefficient for the current block based on the residual information included in the bitstream (S910). More specifically, the entropy decoder 310 of the decoding apparatus may derive the quantized transform coefficient for the current block based on the residual information included in the bitstream.

The decoding apparatus according to an embodiment may derive a residual sample for the current block based on the quantized transform coefficient (S920). More specifically, the dequantizer 321 of the decoding apparatus may derive the transform coefficient from the quantized transform coefficient based on a dequantization process, and the inverse transformer 322 of the decoding apparatus may derive the residual sample for the current block by inversely transforming the transform coefficient.

The decoding apparatus according to an embodiment may generate a reconstructed picture based on the residual sample for the current block (S930). More specifically, the adder 340 of the decoding apparatus may generate the reconstructed picture based on the residual sample for the current block.

In an embodiment, the residual information may include a parity level flag for a parity of the transform coefficient level for the quantized transform coefficient and a first transform coefficient level flag about whether the transform coefficient level is larger than a first threshold. In an example, the parity level flag may represent par_level_flag, the first transform coefficient level flag may represent rem_abs_gt1_flag or abs_level_gtx_flag [n] [0], and the second transform coefficient level flag may represent rem_abs_gt2_flag or abs_level_gtx_flag [n] [1].

In an embodiment, the deriving of the quantized transform coefficient may include decoding the transform coefficient level flag and decoding the parity level flag, and deriving the quantized transform coefficient based on a value of the decoded parity level flag and a value of the decoded first transform coefficient level flag.

In an embodiment, the decoding of the first transform coefficient level flag may be performed prior to the decoding of the parity level flag. For example, the decoding apparatus may perform the decoding for the rem_abs_gt1_flag or the abs_level_gtx_flag [n] [0] prior to the decoding for the par_level_flag.

In an embodiment, the residual information may further include a significant coefficient flag representing whether the quantized transform coefficient is a non-zero significant coefficient, and a second transform coefficient level flag about whether the transform coefficient level of the quantized transform coefficient is larger than a second threshold. In an example, the significant coefficient flag may represent sig_coeff_flag.

In an embodiment, the sum of the number of significant coefficient flags for the quantized transform coefficients within the current block, the number of first transform coefficient level flags, the number of parity level flags, and the number of second transform coefficient level flags, which are included in the residual information, may be a predetermined threshold or less. In an example, the sum of the number of significant coefficient flags for the quantized transform coefficients, the number of first transform coefficient level flags, the number of parity level flags, and the number of second transform coefficient level flags, which are related to the current sub-block within the current block, may be limited to the predetermined threshold or less.

In an embodiment, the predetermined threshold may be determined based on the size of the current block (or current sub-block within the current block).

In an embodiment, the sum of the number of significant coefficient flags, the number of first transform coefficient level flags, and the number of parity level flags, which are included in the residual information, is a third threshold or less, the number of second transform coefficient level flags, which is included in the residual information, is a fourth threshold or less, and the predetermined threshold may represent the sum of the third threshold and the fourth threshold.

In an example, if the size of the current block or the current sub-block within the current block is 4×4, the third threshold may represent K, and at this time, the K may represent one value of 0 to 48. Further, the fourth threshold may represent N, and at this time, the N may represent one value of 0 to 16.

In another example, if the size of the current block or the current sub-block within the current block is 2×2, the third threshold may represent the K, and at this time, the K may represent one value of 0 to 12. Further, the fourth threshold may represent the N, and at this time, the N may represent one value of 0 to 4.

In an embodiment, if the sum of the number of significant coefficient flags, the number of first transform coefficient level flags, the number of parity level flags, and the number of second transform coefficient level flags, which are derived based on the 0th quantized transform coefficient to the nth quantized transform coefficient determined by the coefficient scanning order, reaches a predetermined threshold, an explicit signaling of the significant coefficient flag, the first transform coefficient level flag, the parity level flag, and the second transform coefficient level flag is omitted with respect to the (n+1)th quantized transform coefficient determined by the coefficient scanning order, and a value of the (n+1)th quantized transform coefficient may be derived based on the value of the coefficient level information included in the residual information.

For example, if the sum of the number of sig_coeff_flags, the number of rem_abs_gt1_flags (or abs_level_gtx_flag [n] [0]), the number of par_level_flags, and the number of rem_abs_gt2_flags (or abs_level_gtx_flags [n] Hi), which are derived based on the 0th quantized transform coefficient (or first quantized transform coefficient) to the nth quantized transform coefficient (or nth quantized transform coefficient) determined by the coefficient scanning order, reaches the predetermined threshold, an explicit signaling of the sig_coeff_flag, the rem_abs_gt1_flag (or abs_level_gtx_flag [n] MA the par_level_flag, the abs_level_gtx_flag [n] [1], and the rem_abs_gt2_flag (or abs_level_gtx_flag [n] [1]) is omitted with respect to the (n+1)th quantized transform coefficient determined by the coefficient scanning order, and the value of the (n+1)th quantized transform coefficient may be derived based on the value of the abs_remainder or the dec_abs_level included in the residual information.

In an embodiment, the significant coefficient flags, the first transform coefficient level flags, the parity level flags, and the second transform coefficient level flags, which are included in the residual information, are encoded based on the context, and the coefficient level information may be encoded on a bypass basis.

According to the decoding apparatus and an operating method of the decoding apparatus disclosed in FIGS. 9 and 10, it may be characterized that the decoding apparatus receives a bitstream including residual information (S900), derives a quantized transform coefficient for a current block based on the residual information included in the bitstream (S910), derives a residual sample for the current block based on the quantized transform coefficient (S920), and generates a reconstructed picture based on the residual sample for the current block (S930); and the residual information includes a parity level flag for a parity of the transform coefficient level for the quantized transform coefficient and a first transform coefficient level flag about whether the transform coefficient level is larger than a first threshold, the deriving of the quantized transform coefficient includes decoding the transform coefficient level flag and decoding the parity level flag, and deriving the quantized transform coefficient based on a value of the decoded parity level flag and a value of the decoded first transform coefficient level flag, and the decoding of the first transform coefficient level flag is performed prior to the decoding of the parity level flag. That is, according to the present disclosure, by determining (or changing) the decoding order of the parity level flag for the parity of the transform coefficient level for the quantized transform coefficient and the first transform coefficient level flag about whether the transform coefficient level is larger than the first threshold, it is possible to enhance coding efficiency.

In the aforementioned embodiments, while the methods are described based on the flowcharts shown as a series of steps or blocks, the present disclosure is not limited to the order of steps, and a certain step may occur in different order from or simultaneously with a step different from that described above. Further, those skilled in the art will understand that the steps shown in the flowchart are not exclusive, and other steps may be included or one or more steps in the flowcharts may be deleted without affecting the scope of the present disclosure.

The aforementioned method according to the present disclosure may be implemented in the form of software, and the encoding apparatus and/or the decoding apparatus according to the present disclosure may be included in the apparatus for performing image processing of, for example, a TV, a computer, a smartphone, a set-top box, a display device, and the like.

When the embodiments in the present disclosure are implemented in software, the aforementioned method may be implemented as a module (process, function, and the like) for performing the aforementioned function. The module may be stored in a memory, and executed by a processor. The memory may be located inside or outside the processor, and may be coupled with the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium and/or other storage devices. That is, the embodiments described in the present disclosure may be performed by being implemented on a processor, a microprocessor, a controller, or a chip. For example, the functional units illustrated in each drawing may be performed by being implemented on the computer, the processor, the microprocessor, the controller, or the chip. In this case, information for implementation (for example, information on instructions) or algorithm may be stored in a digital storage medium.

Further, the decoding apparatus and the encoding apparatus to which the present disclosure is applied may be included in a multimedia broadcast transceiver, a mobile communication terminal, a home cinema video device, a digital cinema video device, a surveillance camera, a video communication device, a real-time communication device such as video communication, a mobile streaming device, a storage medium, a camcorder, a Video on Demand (VoD) service provider, an Over the top video (OTT video) device, an Internet streaming service provider, a three-dimensional (3D) video device, a virtual reality (VR) device, an augmented reality (AR) device, a video telephony video device, a transportation terminal (for example, vehicle (including autonomous vehicle), airplane terminal, ship terminal, or the like), and a medical video device, and the like, and may be used to process video signals or data signals. For example, the OTT video device may include a game console, a Blu-ray player, an Internet-connected TV, a home theater system, a smartphone, a tablet PC, a Digital Video Recorder (DVR), and the like.

Further, the processing method to which the present disclosure is applied may be produced in the form of a program executed by a computer, and may be stored in a computer readable recording medium. The multimedia data having a data structure according to the present disclosure may also be stored in the computer readable recording medium. The computer readable recording medium includes all kinds of storage devices and distributed storage devices in which computer readable data are stored. The computer readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk, and an optical data storage device. Further, the computer readable recording medium includes media implemented in the form of a carrier wave (for example, transmission via the Internet). Further, the bitstream generated by the encoding method may be stored in the computer readable recording medium or transmitted through wired/wireless communication networks.

Further, the embodiments of the present disclosure may be implemented as a computer program product by a program code, and the program code may be executed on the computer according to the embodiments of the present disclosure. The program code may be stored on a computer readable carrier.

Figure 11:
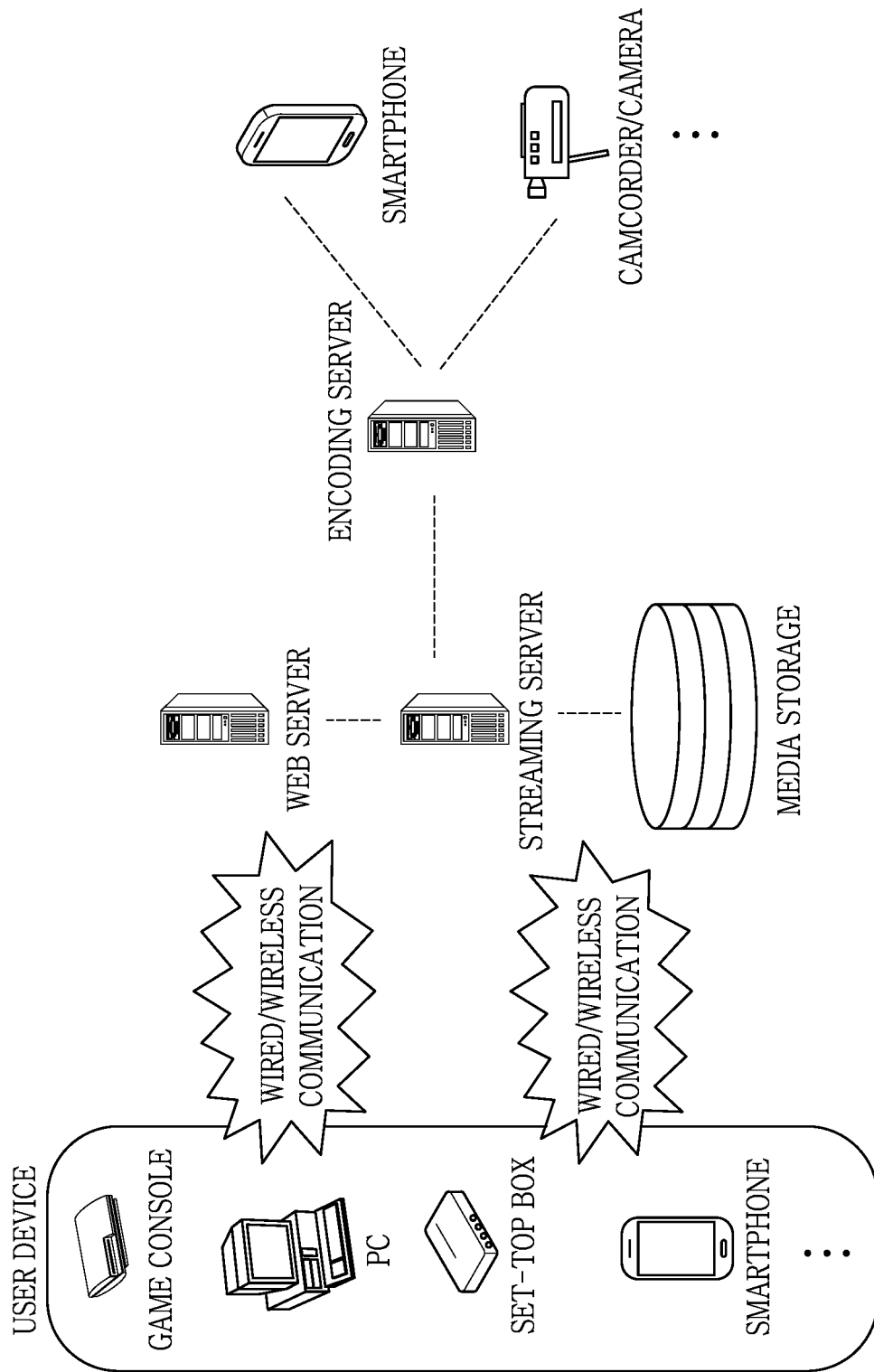
FIG. 11 is a diagram illustrating an example of a contexts streaming system to which the disclosure disclosed in the present document may be applied.

FIG. 11 illustrates an example of a contexts streaming system to which the disclosure disclosed in the present document may be applied.

Referring to FIG. 11, the contents streaming system to which the present disclosure is applied may largely include an encoding server, a streaming server, a web server, a media storage, a user device, and a multimedia input device.

The encoding server serves to compact the contents, which are input from multimedia input devices such as a smartphone, a camera, and a camcorder into digital data, to generate the bitstream and to transmit the bitstream to the streaming server. As another example, when the multimedia input devices such as a smartphone, a camera, and a camcorder directly generate the bitstream, the encoding server may be omitted.

The bitstream may be generated by the encoding method or the bitstream generating method to which the present disclosure is applied, and the streaming server may temporarily store the bitstream in the process of transmitting or receiving the bitstream.

The streaming server serves as a medium of transmitting multimedia data to a user device based on a user request through a web server, and the web server serves as a medium of informing the user of which services are available. If the user requests a desired service from the web server, the web server delivers the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or an encoding server. For example, if contents are received from the encoding server, the contents may be received in real-time. In this case, to provide a smooth streaming service, the streaming server may store the bitstream for a certain time.

Examples of the user device may include a mobile phone, a smartphone, a laptop computer, a digital broadcast terminal, a personal digital assistant (PDA), a portable multimedia player (PMP), a navigation terminal, a slate PC, a tablet PC, an ultrabook, a wearable device (for example, smart watch, smart glass, or head mounted display (HMD)), a digital TV, a desktop computer, a digital signage, and the like.

Each server within the contents streaming system may be operated as a distributed server, and in this case, data received by each server may be processed in a distributed manner

What is claimed is:

1. An image decoding method performed by a decoding apparatus, the method comprising:
  receiving a bitstream comprising residual information;
  deriving transform coefficients for a transform block based on the residual information;
  deriving residual samples for the transform block by performing transformation based on the transform coefficients; and
  generating a reconstructed picture based on the residual samples,
  wherein the residual information comprises a significant coefficient flag, a parity level flag, a first coefficient level flag, a second coefficient level flag, an abs remainder syntax element, and a sign flag for a transform coefficient for the transform block, wherein the significant coefficient flag is related to whether the transform coefficient is a non-zero significant coefficient, the parity level flag is for a parity of a transform coefficient level for the transform coefficient, the first transform coefficient level flag is about whether the transform coefficient level is larger than a first threshold, the second transform coefficient level flag is about whether the transform coefficient level is larger than a second threshold, the abs remainder syntax element is about a remaining value of the transform coefficient level, the sign flag is about a sign of the transform coefficient,
  wherein the deriving of the transform coefficients comprises
  determining a threshold related to a sum of a number of significant coefficient flags for the transform coefficients within the transform block, a number of first transform coefficient level flags, a number of parity level flags, and a number of second transform coefficient level flags based on a size of the transform block;
  decoding the significant coefficient flag, the first transform coefficient level flag, the parity level flag, the second coefficient level flag, the abs remainder syntax element and the sign flag based on the threshold; and
  deriving the transform coefficient based on a value of the decoded significant coefficient flag, a value of the decoded parity level flag, a value of the decoded first transform coefficient level flag, a value of the decoded second transform coefficient level flag, a value of the decoded abs remainder syntax element and a value of the decoded sign flag, and
  wherein the sum of the number of significant coefficient flags for the transform coefficients within the transform block, the number of first transform coefficient level flags, the number of parity level flags, and the number of second transform coefficient level flags, which are comprised in the residual information, is the threshold or less.

2. The method of claim 1, wherein a sum of the number of significant coefficient flags, the number of first transform coefficient level flags, and the number of parity level flags comprised in the residual information is a third threshold or less,
  wherein the number of second transform coefficient level flags comprised in the residual information is a fourth threshold or less, and
  wherein the threshold is a sum of the third threshold and the fourth threshold.

3. The method of claim 1, wherein when the sum of the number of significant coefficient flags, the number of first transform coefficient level flags, the number of parity level flags, and the number of second transform coefficient level flags, which are derived based on an 0th transform coefficient to an nth transform coefficient determined by a coefficient scanning order, reaches the threshold, a value of an (n+1)th transform coefficient is derived based on a value of an abs level syntax element comprised in the residual information.

4. The method of claim 3, wherein the significant coefficient flags, the first transform coefficient flags, the parity level flags, and the second transform coefficient level flags, which are comprised in the residual information, are decoded based on a context, and
  wherein the abs level syntax element is decoded on a bypass basis.

5. An image encoding method performed by an encoding apparatus, the method comprising:
  deriving residual samples for a current block;
  deriving transform coefficients based on the residual samples for the current block; and
  encoding residual information comprising information for the transform coefficients,
  wherein the residual information comprises a significant coefficient flag, a parity level flag, a first coefficient level flag, a second coefficient level flag, an abs remainder syntax element, and a sign flag for a transform coefficient for the current block, wherein the significant coefficient flag is related to whether the transform coefficient is a non-zero significant coefficient, the parity level flag for a parity of a transform coefficient level for the transform coefficient, the first transform coefficient level flag about whether the transform coefficient level is larger than a first threshold, the second transform coefficient level flag is about whether the transform coefficient level is larger than a second threshold, the abs remainder syntax element is about a remaining value of the transform coefficient level, the sign flag is about a sign of the transform coefficient, wherein the encoding of the residual information comprises determining a threshold related to a sum of a number of significant coefficient flags for the transform coefficients within the current block, a number of first transform coefficient level flags, a number of parity level flags, and a number of second transform coefficient level flags based on a size of the transform block;

deriving a value of the significant coefficient flag, a value of the parity level flag, a value of the first transform coefficient level flag, a value of the second transform coefficient level flag, a value of the abs remainder syntax element, a value of the sign flag based on the transform coefficient; and encoding the significant coefficient flag, the first transform coefficient level flag, the parity level flag, the second transform coefficient level flag, the abs remainder syntax element, the sign flag based on the threshold, wherein the sum of the number of significant coefficient flags for the transform coefficients within the current block, the number of first transform coefficient level flags, the number of parity level flags, and the number of second transform coefficient level flags, which are comprised in the residual information, is the threshold or less.

6. The method of claim 5, wherein the threshold is determined based on a size of the current block.

7. The method of claim 5, wherein a sum of the number of significant coefficient flags, the number of first transform coefficient level flags, and the number of parity level flags comprised in the residual information is a third threshold or less, wherein the number of second transform coefficient level flags comprised in the residual information is a fourth threshold or less, and wherein the threshold is a sum of the third threshold and the fourth threshold.

8. The method of claim 5, wherein when the sum of the number of significant coefficient flags, the number of first transform coefficient level flags, the number of parity level flags, and the number of second transform coefficient level flags, which are derived based on an 0th transform coefficient to an nth transform coefficient determined by a coefficient scanning order, reaches the threshold, a value of an (n+1)th transform coefficient is derived based on a value of an abs level syntax element comprised in the residual information.

9. The method of claim 8, wherein the significant coefficient flags, the first transform coefficient flags, the parity level flags, and the second transform coefficient level flags, which are comprised in the residual information, are encoded based on context, and wherein the abs level syntax element is encoded on a bypass basis.

10. A non-transitory computer readable storage medium storing a bitstream generated by a method, the method comprising:

deriving residual samples for a current block;

deriving transform coefficients based on the residual samples for the current block; and encoding residual information comprising information for the transform coefficients to generate the bitstream, wherein the residual information comprises a significant coefficient flag, a parity level flag, a first coefficient level flag, a second coefficient level flag, an abs remainder syntax element, and a sign flag for a transform coefficient for the current block, wherein the significant coefficient flag is related to whether the transform coefficient is a non-zero significant coefficient, the parity level flag for a parity of a transform coefficient level for the transform coefficient, the first transform coefficient level flag about whether the transform coefficient level is larger than a first threshold, the second transform coefficient level flag is about whether the transform coefficient level is larger than a second threshold, the abs remainder syntax element is about a remaining value of the transform coefficient level, the sign flag is about a sign of the transform coefficient, wherein the encoding of the residual information comprises determining a threshold related to a sum of a number of significant coefficient flags for the transform coefficients within the current block, a number of first transform coefficient level flags, a number of parity level flags, and a number of second transform coefficient level flags based on a size of the transform block;

deriving a value of the significant coefficient flag, a value of the parity level flag, a value of the first transform coefficient level flag, a value of the second transform coefficient level flag, a value of the abs remainder syntax element, a value of the sign flag based on the transform coefficient; and encoding the significant coefficient flag, the first transform coefficient level flag, the parity level flag, the second transform coefficient level flag, the abs remainder syntax element, the sign flag based on the threshold, wherein the sum of the number of significant coefficient flags for the transform coefficients within the current block, the number of first transform coefficient level flags, the number of parity level flags, and the number of second transform coefficient level flags, which are comprised in the residual information, is the threshold or less.

11. The non-transitory computer readable storage medium of claim 10, wherein the threshold is determined based on a size of the current block.

12. The non-transitory computer readable storage medium of claim 10, wherein a sum of the number of significant coefficient flags, the number of first transform coefficient level flags, and the number of parity level flags comprised in the residual information is a third threshold or less, wherein the number of second transform coefficient level flags comprised in the residual information is a fourth threshold or less, and wherein the threshold is a sum of the third threshold and the fourth threshold.

13. The non-transitory computer readable storage medium of claim 10, wherein when the sum of the number of significant coefficient flags, the number of first transform coefficient level flags, the number of parity level flags, and the number of second transform coefficient level flags, which are derived based on an 0th quantized transform coefficient to an nth quantized transform coefficient determined by a coefficient scanning order, reaches the threshold, a value of an (n+1)th quantized transform coefficient is derived based on a value of an abs level syntax element comprised in the residual information.

14. The non-transitory computer readable storage medium of claim 13, wherein the significant coefficient flags, the first transform coefficient flags, the parity level flags, and the second transform coefficient level flags, which are comprised in the residual information, are decoded based on context, and wherein the abs level syntax element is decoded on a bypass basis.

* * * * *